United States Patent
Arai et al.

(10) Patent No.: US 11,062,160 B2
(45) Date of Patent: Jul. 13, 2021

(54) PERSON MONITORING SYSTEM AND PERSON MONITORING METHOD

(71) Applicant: PANASONIC I-PRO SENSING SOLUTIONS CO., LTD., Fukuoka (JP)

(72) Inventors: Takamitsu Arai, Fukuoka (JP); Takashi Kamio, Kanagawa (JP); Koji Kawamoto, Fukuoka (JP); Yuumi Miyake, Kanagawa (JP); Eisaku Miyata, Kanagawa (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 0 days.

(21) Appl. No.: 16/846,990

(22) Filed: Apr. 13, 2020

(65) Prior Publication Data

US 2020/0327347 A1 Oct. 15, 2020

(30) Foreign Application Priority Data

Apr. 15, 2019 (JP) .............................. JP2019-077103

(51) Int. Cl.
*G06K 9/00* (2006.01)

(52) U.S. Cl.
CPC ..... *G06K 9/00892* (2013.01); *G06K 9/00275* (2013.01); *G06K 9/00369* (2013.01); *G06K 2009/00946* (2013.01)

(58) Field of Classification Search
CPC ........... G06K 9/00892; G06K 9/00275; G06K 2009/00946; G06K 9/00993; G06K 9/00979; G06K 9/0077; G06K 9/00288; G06K 9/00771; G06K 2209/15; G06K 9/00369; G06K 2009/00738; G06K 9/00228; G06K 9/00248; G06K 9/00778; G06K 2209/27; G06K 9/0087; G06K 9/00201; G06K 9/002221; G06K 9/00281;

(Continued)

(56) References Cited

U.S. PATENT DOCUMENTS

2003/0039380 A1* 2/2003 Sukegawa .......... G06K 9/00288
                                                          382/118
2006/0204050 A1* 9/2006 Takizawa ........... G06K 9/00912
                                                          382/115

(Continued)

FOREIGN PATENT DOCUMENTS

JP          2017-040983          2/2017

*Primary Examiner* — Nimesh Patel
(74) *Attorney, Agent, or Firm* — Greenblum & Bernstein, P.L.C.

(57) ABSTRACT

A server analyzes feature information including a whole body and a face of a person reflected in each of video images from a plurality of monitoring cameras and stores a whole body image and a face image as an analysis result. In response to designation of the whole body image and the face image of a person of interest, a client terminal sends a request for execution of each of first collation processing and second collation processing to the server. When a person matching at least one of the whole body image and the face image of the person of interest is specified by at least one of the first collation processing and the second collation processing, the server sends an alarm notification to the client terminal that the person of interest is found to the client terminal.

13 Claims, 21 Drawing Sheets

(58) Field of Classification Search
CPC .. G06K 9/00302; G06K 9/00362; G06K 9/46; G06K 9/6219; G06K 9/6267; G06K 7/10366; G06K 9/3208; G06K 19/06037; G06K 19/0723; G06K 19/08; G06K 9/00912; G06K 2009/00328; G06K 9/00013; G06K 9/00255; G06K 21/32; G06K 9/00335; G06K 9/00342; G06K 9/00805; G06K 9/3241; G06K 9/3216; G06K 9/6201; G06K 2009/4666; G06K 9/00268; G06K 9/20; G06K 9/6807; G06K 2009/00939; G06K 9/00845; G06K 9/00671; G06K 2209/21; G06K 9/4676; G06K 9/00664; G06K 9/00221; G06K 9/00617; G06F 21/32; G06F 16/29; G06F 21/31; G06F 21/50; G06F 3/0481; G06F 16/587; G06F 16/9577; G06F 1/3206; G06F 1/3209; G06F 1/3231; G06F 21/00; G06F 2221/2149; G06F 3/04845; G06F 16/235; G06F 3/147; G06F 8/65; G06F 16/9535; G06F 16/26; G06F 21/562; G06F 16/24565; G06F 16/285; G06F 16/322; G06F 16/9574; G06F 3/0484; G06F 21/554; G06F 3/017; G06F 3/011; G06F 21/88; G06F 3/04815; G06Q 20/3226; G06Q 20/3674; G06Q 20/32; G06Q 20/325; G06Q 20/3276; G06Q 20/40145; G06Q 20/425; G06Q 50/265; G06Q 20/40; G06Q 10/06; G06Q 10/063114; G06Q 10/06398; G06Q 10/1053; G06Q 30/0255; G06Q 30/0269; G06Q 20/42; H04L 63/0861; H04L 63/102; H04L 67/22; H04L 63/08; H04L 63/12; H04L 63/10; H04L 67/18; H04L 2463/102; H04L 67/125; H04L 2463/082; H04L 67/306; H04L 67/2842; H04L 63/108; H04L 67/26; H04L 63/0853; G06T 2207/10016; G06T 7/292; G06T 19/006; G06T 7/70; G06T 11/60; G06T 2207/20224; G06T 7/20; G06T 7/74; G06T 2207/30196; G06T 17/00; G06T 2207/10028; G06T 7/75; G06T 7/77; G06T 1/00; G06T 7/73; G06T 7/00; G06T 1/0007; G06T 2207/10004; G06T 2207/30201; G06T 7/60; G06T 13/40; G06T 2200/24; G06T 17/05; G06T 19/003; G06T 3/4038; H04W 4/025; H04W 4/02; H04W 4/029; H04W 64/00; H04W 4/21; H04W 4/90; H04W 76/50; H04W 4/021; H04W 12/06; H04W 12/08; H04W 12/63; H04W 12/065; H04W 4/023; H04W 52/0251; H04W 12/104; H04W 12/12; H04W 12/126; H04W 12/65; H04W 12/68; G07C 1/10; G07C 9/37; G07C 9/257; G07C 9/00309; G07C 9/00571; G07C 9/26; G07C 9/38; G07C 9/22; G07C 9/27; G07C 2009/00769; H04M 3/493; H04M 2201/38; H04M 2203/6018; H04M 2207/18; H04M 2242/30; H04M 3/42; H04M 3/42365; G08B 13/19613; G08B 13/19645; G08B 13/19652; G08B 13/19663; G08B 13/19671; G08B 31/00; G08B 27/006; G06N 5/022; G06N 5/04; G06N 5/048; G06N 3/004; A61B 5/1115; A61B 5/117; A61B 5/1128; A61B 5/0013; A61B 5/002; A61B 5/0033

See application file for complete search history.

(56) References Cited

U.S. PATENT DOCUMENTS

2011/0135166 A1\* 6/2011 Wechsler ............... G06K 9/627
                                                                 382/118
2013/0301886 A1\* 11/2013 Koda .................. G06K 9/00288
                                                                 382/118

\* cited by examiner

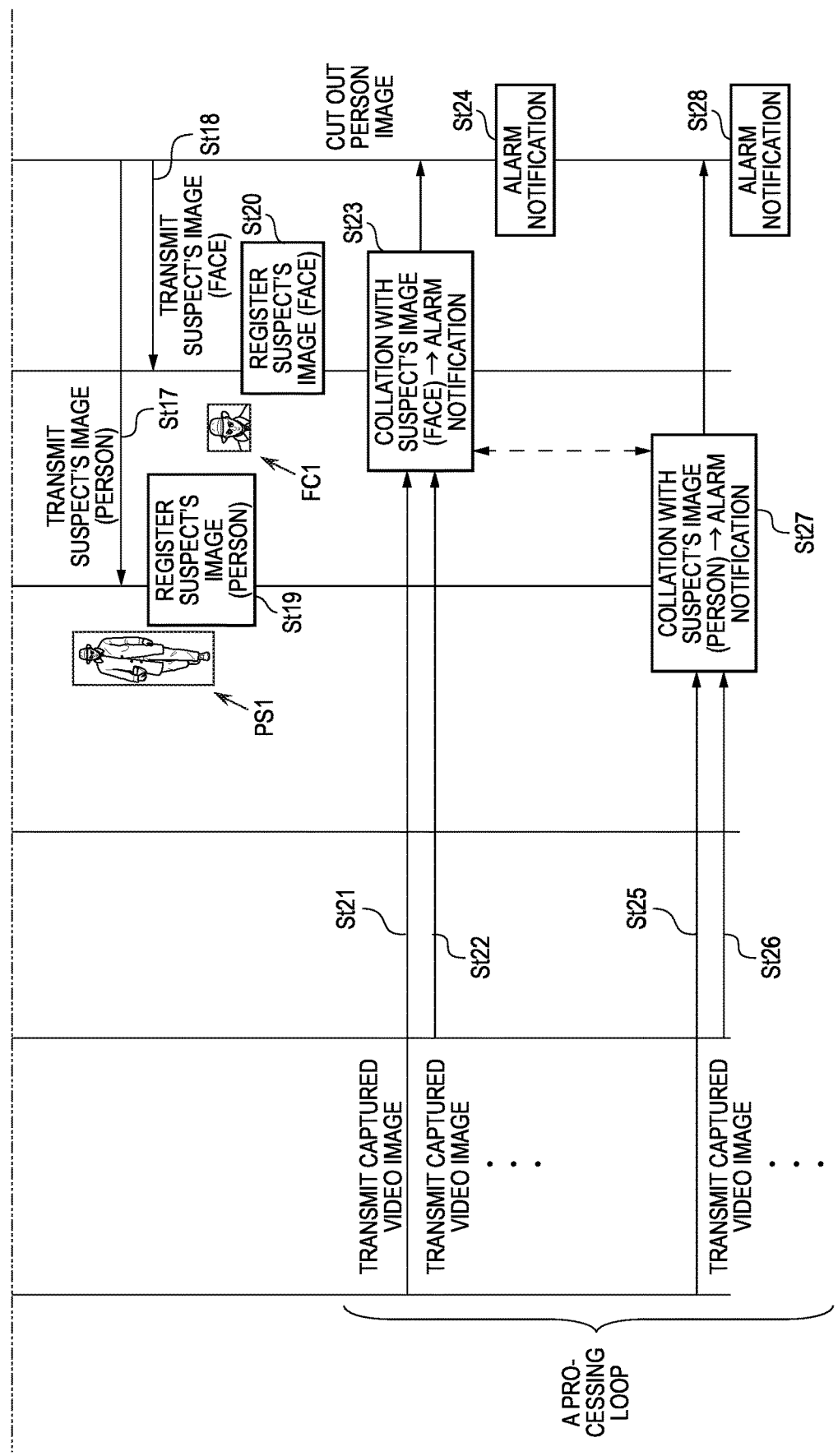

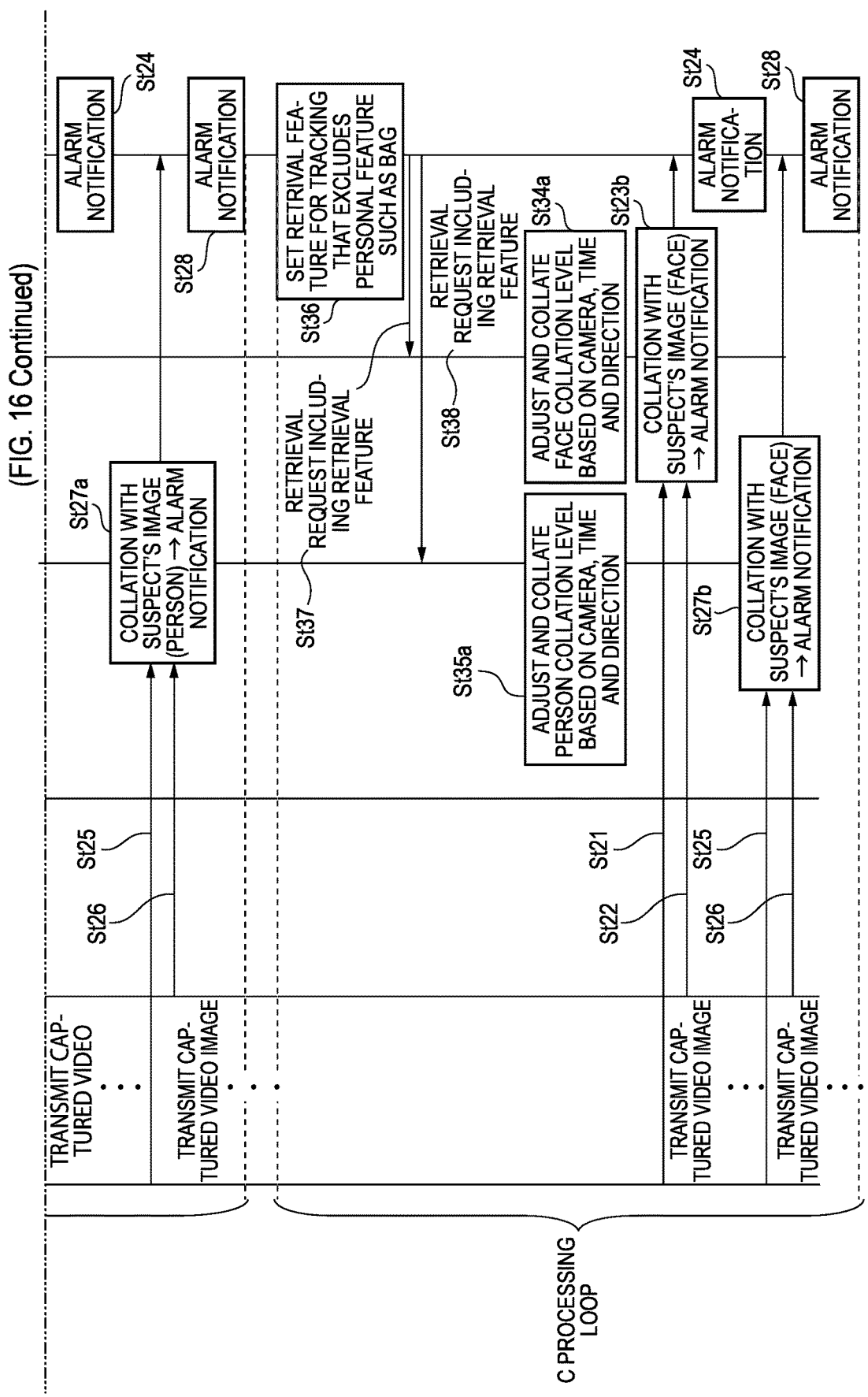

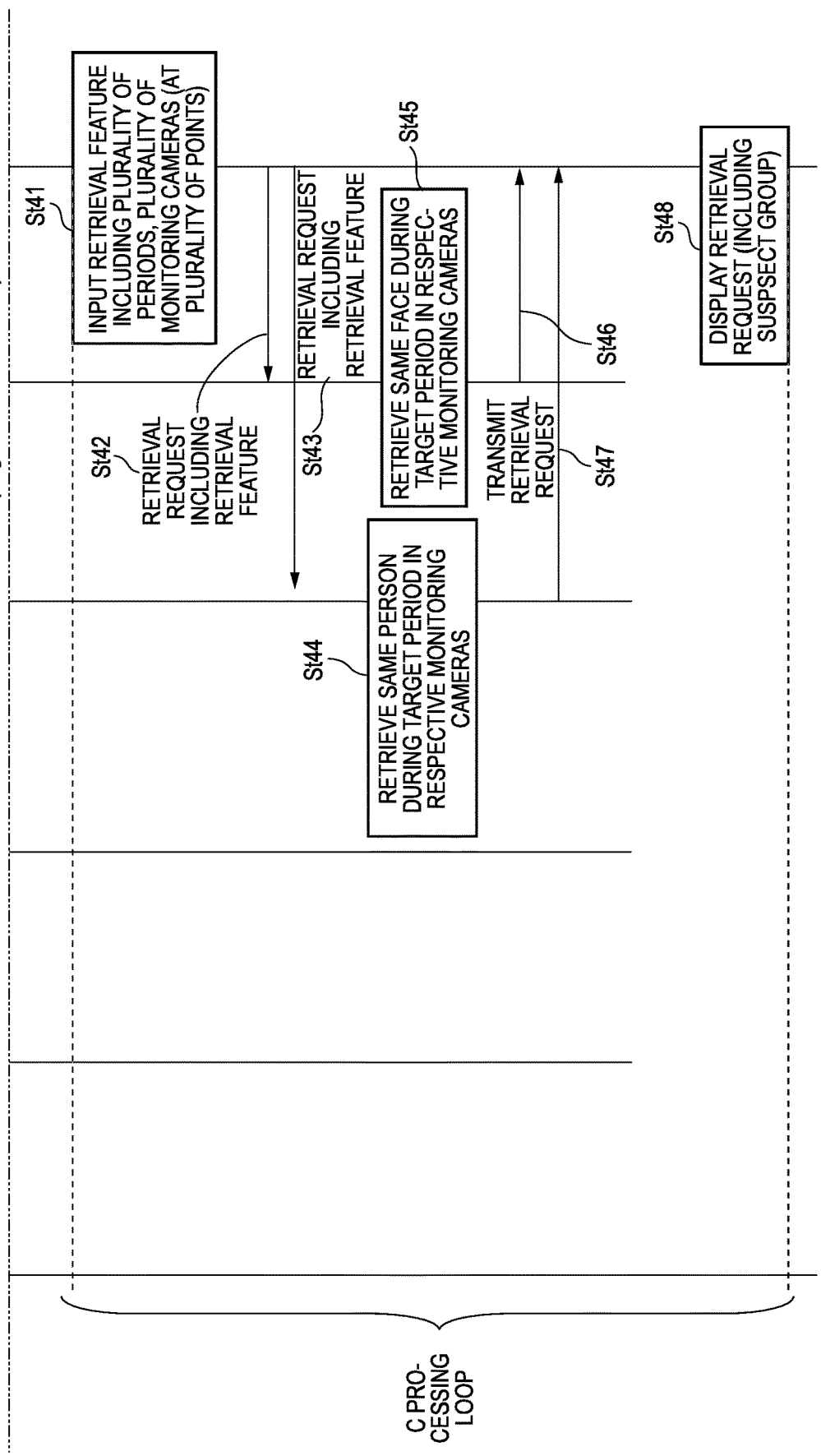

PERSON MONITORING SYSTEM AND PERSON MONITORING METHOD

BACKGROUND OF THE INVENTION

1. Field of the Invention

The present disclosure relates to a person monitoring system and a person monitoring method for monitoring a person reflected in an angle of view of a monitoring camera using a video image captured by the monitoring camera installed outdoors.

2. Background Art

JP-A-2017-40983 discloses a security system in which, when a predetermined event is detected in a monitoring region, a captured image in which a suspect is captured is extracted from captured images recorded on a recorder, a transitional captured image based on a behavior of the suspect is displayed, and map information indicating a capturing position of the captured image is displayed. In the security system, when a selection input of a captured image targeted for position display is received for the transition captured image, position information of a capturing point of the corresponding captured image is displayed on the map information. With this configuration, it is possible to visually obtain tracking information on the behavior of a monitoring target such as a person in the monitoring region.

However, in JP-A-2017-40983, there is no consideration of extracting a whole body image and face image of a suspect, which are appearance features, from a captured image of a suspect of an incident or the like (for example, an incident or an accident) obtained from a video image captured by at least one of the monitoring cameras installed at each of numerous outdoor locations and tracking the suspect using the whole body image and face image of the suspect.

When an incident or the like occurs, it is important to grasp appearance feature and whereabouts of the suspect at an early stage in an initial police investigation. However, in the related art so far, when an incident or the like occurs, a police officer has sorted out the likely suspects and the direction of escape, relying on clues such as visual browsing of the video image captured the monitoring camera installed at each of a plurality of locations around the site and information from witnesses. For that reason, there is a problem that it takes time for the police officer to grasp appearance feature of the suspect and the escape direction, which lead to a delay in initial investigation is delayed and inefficiency.

SUMMARY OF INVENTION

The present disclosure has been devised in view of the conventional circumstances described above and an object thereof is to provide a person monitoring system and a person monitoring method for, when an incident or the like occurs, extracting a whole body image and a face image representing appearance feature of a suspect with high accuracy, tracking the suspect, and supporting an early grasp of an escape route of the suspect reflected in a captured video image of a monitoring camera, thereby improving the convenience of police investigation.

According to an aspect of the present disclosure, there is provided a person monitoring system including a server communicably connected to each of n (n is an integer of 2 or more) monitoring cameras and a client terminal communicably connected to the server, in which the server is configured to, when captured video images sent from each of the n monitoring cameras are received, analyze feature information including a whole body and a face of a person reflected in each of the captured video images and hold a whole body image obtained by cutting out the whole body of the person and a face image obtained by cutting out the face of the person as an analysis result, the client terminal is configured to, in response to designation of the whole body image and the face image of a person of interest, send a request for execution of each of first collation processing targeted for the whole body image of the person of interest and second collation processing targeted for the face image of the person of interest to the server, and the server is configured to, when a person matching at least one of the whole body image and the face image of the person of interest is specified by at least one of the first collation processing and the second collation processing, send an alarm notification to the client terminal that the person of interest is found, to the client terminal.

According to another aspect of the present disclosure, there is provided a person monitoring method executed by a person monitoring system which includes a server communicably connected to each of n (n is an integer of 2 or more) monitoring cameras and a client terminal communicably connected to the server, the person monitoring method including, when captured video images sent from each of the n monitoring cameras are received, analyzing feature information including a whole body and a face of a person reflected in each of the captured video images and holding a whole body image obtained by cutting out the whole body of the person and a face image obtained by cutting out the face of the person as an analysis result, in response to designation of the whole body image and face image of a person of interest, sending a request for execution of each of first collation processing targeted for the whole body image of the person of interest and second collation processing targeted for the face image of the person of interest to the server, and, when a person matching at least one of the whole body image and the face image of the person of interest is specified by at least one of the first collation processing and the second collation processing, sending an alarm notification to the client terminal that the person of interest is found.

According to another aspect of the present disclosure, there is provided a person monitoring system including a server communicably connected to each of n (n is an integer of 2 or more) monitoring cameras and a client terminal communicably connected to the server, in which the server is configured to, when captured video images sent from each of the n monitoring cameras are received, analyze feature information including a whole body and a face of a person reflected in each of the captured video images and hold a whole body image obtained by cutting out the whole body of the person and a face image obtained by cutting out the face of the person as an analysis result, the client terminal is configured to, in response to designation of k (k is an integer of 2 or more satisfying k≤n) monitoring cameras among the n monitoring cameras and respective capturing periods of the k monitoring cameras, send a request for execution of retrieval processing of a whole body and a face of the same person of interest reflected in captured video images captured by the k monitoring cameras to the server, and the server is configured to, when a person matching at least one of the whole body image and the face image of the person of interest is specified by the retrieval processing, send a retrieval result including at least one of the whole body image and the face image of the person of interest for each of the k monitoring cameras to the client terminal.

According to another aspect of the present disclosure, there is provided a person monitoring method executed by a person monitoring system which includes a server communicably connected to each of n (n is an integer of 2 or more) monitoring cameras and a client terminal communicably connected to the server, the person monitoring method including, when captured video images sent from each of the n monitoring cameras are received, analyzing feature information including a whole body and a face of a person reflected in each of the captured video images and holding a whole body image obtained by cutting out the whole body of the person and a face image obtained by cutting out the face of the person as an analysis result, in response to designation of k (k is an integer of 2 or more satisfying k≤n) monitoring cameras among the n monitoring cameras and respective capturing periods of the k monitoring cameras, sending a request for execution of retrieval processing of a whole body and face of the same person of interest reflected in the captured video images captured by the k monitoring cameras to the server, and when a person matching at least one of the whole body image and the face image of the person of interest is specified by the retrieval processing, sending a retrieval result including at least one of the whole body image and the face image of the person of interest for each of the k monitoring cameras to the client terminal.

According to the present disclosure, it is possible to, when an incident or the like occurs, extract a whole body image and a face image representing appearance feature of a suspect with high accuracy, and accurately improve the convenience of police investigation by supporting an early grasp of a suspect's escape route reflected in a captured video image of a monitoring camera.

DETAILED DESCRIPTION OF THE EXEMPLARY EMBODIMENT

Background Leading to Configuration of Embodiment 1

However, in JP-A-2017-40983, there is no consideration of extracting a whole body image and face image of a suspect, which are appearance features, from a captured image of a suspect of an incident or the like (for example, an incident or an accident) obtained from a video image captured by at least one of the monitoring cameras installed at each of numerous outdoor locations and tracking the suspect using the whole body image and face image of the suspect.

When an incident or the like occurs, it is important to grasp appearance feature and whereabouts of the suspect at an early stage in an initial police investigation. However, in the related art so far, when an incident or the like occurs, a police officer has sorted out the likely suspects and the direction of escape, relying on clues such as visual browsing of the video image captured the monitoring camera installed at each of a plurality of locations around the site and information from witnesses. For that reason, there is a problem that it takes time for the police officer to grasp appearance feature of the suspect and the escape direction, which lead to a delay in initial investigation is delayed and inefficiency.

In the following Embodiment 1, description will be made on a person monitoring system and a person monitoring method for, when an incident or the like occurs, extracting a whole body image and a face image representing appearance feature of a suspect with high accuracy, tracking the suspect, and supporting an early grasp of an escape route of the suspect reflected in a captured video image of a monitoring camera, thereby improving the convenience of police investigation.

Embodiment 1

Hereinafter, an embodiment that specifically discloses a person monitoring system and a person monitoring method according to the present disclosure will be described in detail with reference to the accompanying drawings as appropriate. However, an unnecessarily detailed description may be omitted. For example, a detailed description of a well-known item or a redundant description of substantially the same configuration may be omitted. This is to prevent the following description from being unnecessarily redundant and to facilitate understanding of those skilled in the art. The accompanying drawings and the following description are provided for those skilled in the art to fully understand the present disclosure, and are not intended to limit the subject matter described in the claims.

Hereinafter, a use case in which a person monitoring system supports an investigation by a police for a person (an example of a person of interest) who is a suspect who may have caused an incident or the like (for example, an incident or an accident) by a police will be described as an example.

Figure 1:
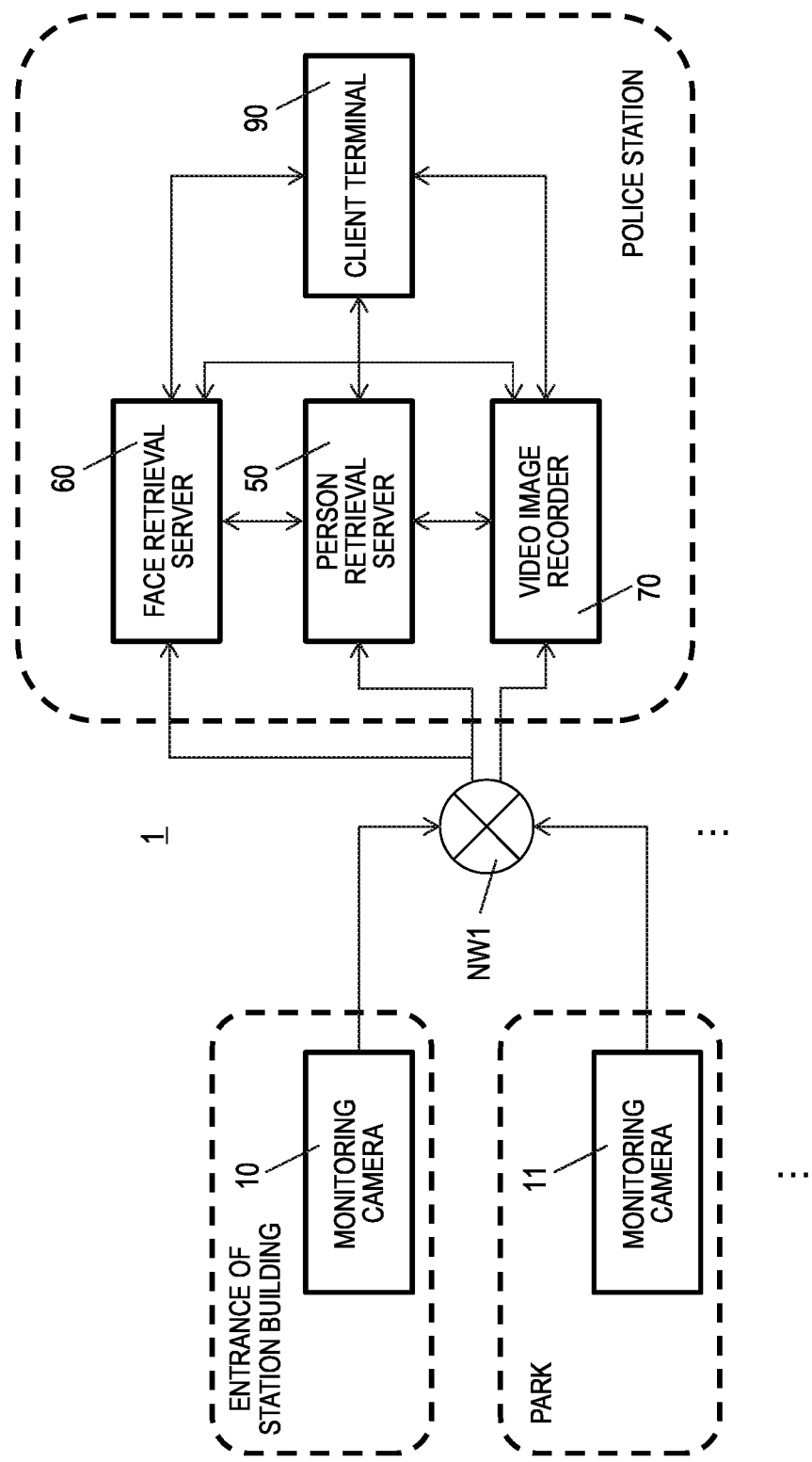
FIG. 1 is a block diagram illustrating a system configuration example of a person monitoring system according to Embodiment 1.

FIG. 1 is a block diagram illustrating a system configuration example of a person monitoring system 1 according to Embodiment 1. The person monitoring system 1 is configured to include n (n is an integer of 2 or more) monitoring cameras 10, 11, . . . installed at different locations outdoors, a person retrieval server 50, a face retrieval server 60, and a video image recorder 70, and a client terminal 90. As illustrated in FIG. 1, each of the monitoring cameras 10, 11, . . . is installed outdoors (for example, at a point with traffic), for example, the monitoring camera 10 is installed at the entrance of a station building, and the monitoring camera 11 is installed in a park. The other one or more monitoring cameras may be installed at, for example, an entrance of a private house, an entrance of a shopping center, a sidewalk in a city, an airport, and the like. However, each of the monitoring cameras 10, 11, . . . is not limited to being installed outdoors. The person retrieval server 50, the face retrieval server 60, the video image recorder 70, and the client terminal 90 are respectively installed in, for example, a predetermined room in a police station. The person retrieval server 50, the face retrieval server 60, the video image recorder 70, and the client terminal 90 need not be installed in the police station. In the following description, the video image recorder 70 may be provided as an online storage connected to each of the person retrieval server 50 and the face retrieval server 60 via a communication line such as the Internet, instead of the on-premises management in the police station.

Each of the monitoring cameras 10, 11, . . . has the same internal configuration. The monitoring cameras 10, 11, . . . are communicably connected to each of the person retrieval server 50, the face retrieval server 60, and the video image recorder 70 via a network NW1 such as an intranet or Internet communication line. The network NW1 is configured by a wired communication line (for example, an optical communication network using an optical fiber), but may be configured by a wireless communication network.

Each of the monitoring cameras 10, 11, . . . can image a subject (for example, a video image indicating the situation at the installation point) within a predetermined angle of view set at the time of installation, and repeatedly transmits data of a captured video image to each of the person retrieval server 50, the face retrieval server 60, and the video image recorder 70. Hereinafter, the data of the captured video image includes not only the captured video image but also identification information (in other words, position information of the installation point of the monitoring camera) of the monitoring camera that has imaged the captured video image and information of capturing date and time.

Figure 3:
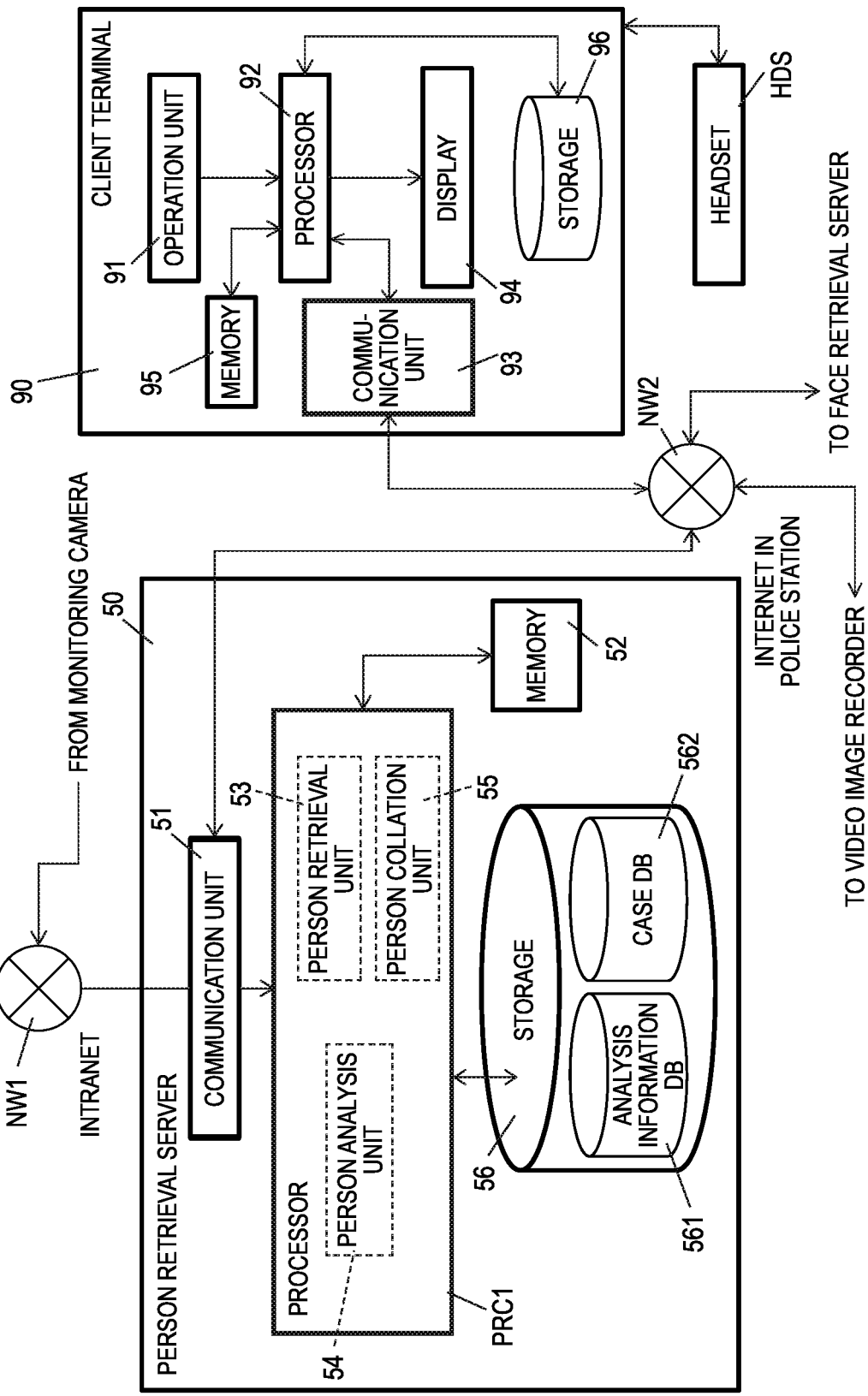
FIG. 3 is a block diagram illustrating an example of an internal configuration of each of a person retrieval server and a client terminal.

The person retrieval server 50 as an example of the server is installed in, for example, a police station, receives data of the captured video image transmitted from each of the monitoring cameras 10, 11, . . . installed at all or a part of points under the jurisdiction of the police station, and temporarily stores the data in a memory 52 or storage 56 for various processes by a processor PRC1 (see FIG. 3).

Each time the stored captured image data is sent from each of the monitoring cameras 10, 11, . . . , and received by the person retrieval server 50, the stored captured image data is analyzed by the person retrieval server 50 for feature information relating to appearance of a person reflected in the captured video image. This analysis result includes, for example, a whole body image obtained by cutting out the whole body of a person from a captured image forming a captured video image, and is stored in the storage 56 of the person retrieval server 50 so as to be used for collation processing (an example of the first collation processing) of a suspect's whole body image. Specifically, the person retrieval server 50 acquires, as the analysis result described above, extracted information (for example, feature information such as the whole body, face, gender, age, height, and a body type, clothing, possessions, wearing goods, and the like of the person reflected in the captured image) relating to a person reflected in the captured video image, and stores the extracted information in the storage 56 in association with the data of the captured video image. For example, when an incident or the like occurs, the client terminal 90 generates a retrieval request for a suspect who satisfies a retrieval condition and sends the retrieval request to the person retrieval server 50 by an operation of inputting an appearance feature element (see FIG. 7) of the suspect as retrieval feature (that is, retrieval condition). In response to this retrieval request, the person retrieval server 50 retrieves a person who satisfies the retrieval condition included in the retrieval request using the analysis results of the captured video images of the respective monitoring cameras 10, 11, . . . . The client terminal 90 generates a registration request for a whole body image of the suspect and sends the registration request to the person retrieval server 50 by an operation for registering the whole body image of the suspect as a whole body image used for the collation processing. In response to the registration request, the person retrieval server 50 collates the presence or absence of a whole body image that matches the whole body image of the suspect included in the registration request, using the analysis results of the captured video images of the respective monitoring cameras 10, 11, . . . . The face retrieval server 60 as an example of the server is installed in, for example, a police station, receives data of the captured video image transmitted from each of the monitoring cameras 10, 11, . . . installed at all or a part of points under the jurisdiction of the police station, and temporarily stores the data in a memory 62 or storage 66 for various processes by a processor PRC2 (see FIG. 4).

Each time the stored captured image data is sent from each of the monitoring cameras 10, 11, . . . , and received by the face retrieval server 60, the stored captured image data is analyzed by the face retrieval server 60 for feature information relating to appearance of a face of the person reflected in the captured video image. This analysis result includes, for example, a face image obtained by cutting out the face portion of a person from a captured image forming a captured video image, and is stored in the storage 66 of the face retrieval server 60 so as to be used for a collation processing (an example of second collation processing) of a suspect's face image. Specifically, the face retrieval server 60 acquires, as the analysis result described above, extracted information (for example, feature information such as the face, facial expression, gender, age, and wearing goods such as glasses of a person reflected in the captured video image) relating to the face of the person reflected in the captured video image, and stores the extracted information in the storage 66 in association with the data of the captured video image. For example, when an incident or the like occurs, the client terminal 90 generates a registration request for the face image of the suspect and sends the registration request to the face retrieval server 60 by an operation for registering the face image of the suspect as a face image used for the collation processing. In response to the registration request, the face retrieval server 60 collates the presence or absence of a face image that matches the face image of the suspect included in the registration request, using the analysis results of the captured video images of the respective monitoring cameras 10, 11, . . . described above.

The client terminal 90 is, for example, installed in a police station, and is used by a staff member of the police station (that is, a police officer who is a user in the police station), and is, for example, a desktop, laptop, or notebook personal computer (PC). When an incident or the like occurs, the user hears various information on the incident or the like as sighting information by telephone from a reporter (for example, a witness) who has reported the occurrence of the incident or the like to the police station, and inputs and records data by operating the client terminal 90. The client terminal 90 is not limited to the PC described above, and may be a computer having a communication function such as a smartphone, a tablet terminal, and a personal digital assistant (PDA). The client terminal 90 generates a retrieval request for causing the person retrieval server 50 to execute retrieval of a suspect (an example of a person of interest) matching the sighting information described above, sends the retrieval request to the person retrieval server 50, receives the retrieval result, and displays the retrieval result on a display 94.

The video image recorder 70 is installed, for example, in a police station, receives data of the captured video image transmitted from each of the monitoring cameras 10, 11, . . . installed at all or a part of the points under the jurisdiction of the police station, and stores the data for backup. In response to a request from the client terminal 90 according to a user operation, the video image recorder 70 may send data of a captured video image of a monitoring camera that satisfies the request to the client terminal 90. The person retrieval server 50, the face retrieval server 60, the video image recorder 70, and the client terminal 90 are communicably connected to each other via a network NW2 such as an intranet in a police station or the Internet.

Although only one person retrieval server 50, face retrieval server 60, video recorder 70, and client terminal 90 installed in a police station is installed in FIG. 1, a plurality of retrieval servers 50, face retrieval servers 60, video image recorders 70, and client terminals 90 may be provided. In particular, the client terminal 90 may be provided separately as a client terminal for sending a retrieval request to the person retrieval server 50 and a client terminal for sending a retrieval request to the face retrieval server 60. In the person monitoring system 1, a plurality of police stations may also be included. In the person monitoring system 1 illustrated in FIG. 1, the person retrieval server 50 and the face retrieval server 60 may be configured by the same computer device (for example, a desktop or laptop personal computer).

Figure 2:
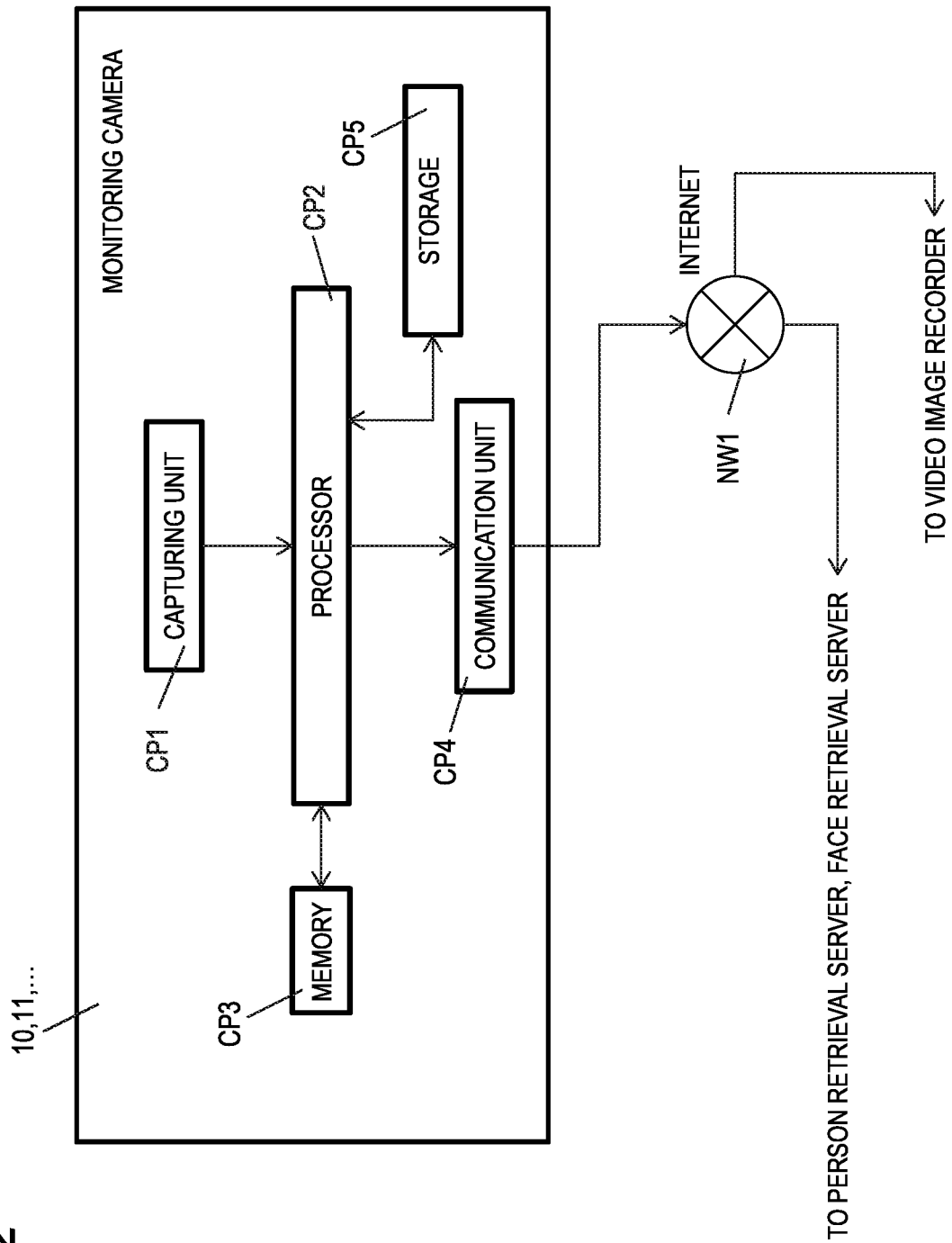
FIG. 2 is a block diagram illustrating an example of an internal configuration of a monitoring camera.

FIG. 2 is a block diagram illustrating an example of an internal configuration of the monitoring cameras 10, 11, . . . . Each of the monitoring cameras 10, 11, . . . has the same configuration, and the monitoring camera 10 will be described below as an example. The monitoring camera 10 is configured to include a capturing unit CP1, a processor CP2, a memory CP3, a communication unit CP4, and storage CP5. Each of the monitoring cameras 10, 11, . . . may have a plurality of capturing units CP1, and may be, for example, a multi-sensor camera having angles of view in two directions. This is because the first capturing unit images within an angle of view that allows an installation point to be viewed over a wide area, and the second capturing unit captures an image so as to capture a blind angle range (for example, a region where a pedestrian walks vertically downward from the installation point of the monitoring camera 10) of the angle of view of the first capturing unit. Even when a plurality of capturing units CP1 are provided, the internal configuration of each capturing unit CP1 is the same.

The capturing unit CP1 is configured to include a condensing lens and a solid-state capturing device such as a charge coupled device (CCD) image sensor or a complementary metal oxide semiconductor (CMOS) image sensor. While the power of the monitoring camera 10 is on, the capturing unit CP1 constantly outputs data of a captured video image of a subject obtained based on capturing by the solid-state capturing device to the processor CP2. The capturing unit CP1 may include a mechanism for changing a zoom magnification at the time of capturing.

The processor CP2 is configured using, for example, a central processing unit (CPU), a digital signal processor (DSP), or a field-programmable gate array (FPGA). The processor CP2 functions as a control unit of the monitoring camera 10, performs control processing for comprehensively controlling the operation of each unit of the monitoring camera 10 as a whole, input and output processing of data with each unit of the monitoring camera 10, and data arithmetic processing, and data storing processing. The processor CP2 operates according to a program stored in the memory CP3. The processor CP2 uses the memory CP3 during the operation, acquires current time information, performs various known image processing on data of the captured video image imaged by the capturing unit CP1, and then records the data in the storage CP5. Although not illustrated in FIG. 2, when the monitoring camera 10 includes a global navigation satellite system (GNSS) receiver, the current position information may be acquired from the GNSS receiver, and the position information may be recorded in association with the data of the captured video image.

Here, the GNSS receiver will be briefly described. The GNSS receiver receives satellite positioning signals transmitted from a plurality of GNSS transmitters (for example, four navigation satellites) and including their own signal transmission times and position coordinates. The GNSS receiver calculates the current position coordinates of the monitoring camera 10 and the reception time of the satellite signal using a plurality of satellite positioning signals. This calculation may be executed by the processor CP2 to which the output from the GNSS receiver is input, instead of the GNSS receiver. Information on the reception time may be used for correcting the system time of the monitoring camera 10. The system time is used, for example, for recording a capturing time of a captured image forming a captured video image.

The processor CP2 may variably control capturing conditions (for example, zoom magnification) of the capturing unit CP1 according to an external control command received by the communication unit CP4. For example, when an external control command instructs to change the zoom magnification, the processor CP2 changes the zoom magnification at the time of capturing of a capturing unit selected by the control command according to the control command.

The processor CP2 repeatedly sends data of the captured video image recorded in the storage 15 to each of the person retrieval server 50, the face retrieval server 60, and the video image recorder 70 via the communication unit CP4. Here, the term "repeated sending" is not limited to transmission at the time when a predetermined period of time elapses, but may include transmission each time a predetermined irregular time interval elapses instead of a fixed period, and includes transmitting a plurality of times.

The memory CP3 is configured using, for example, a random access memory (RAM) and a read only memory (ROM), and temporarily stores a program necessary for executing the operation of the monitoring camera 10, and further stores information or data generated during the operation. The RAM is a work memory used when the processor CP2 operates, for example. In the ROM, for example, a program for controlling the processor CP2 is stored in advance. The memory CP3 stores, for example, identification information (for example, a serial number) for identifying the monitoring camera 10 and various setting information.

The communication unit CP4 sends data of the captured video image recorded in the storage 15 to the person retrieval server 50, the face retrieval server 60, and the video image recorder 70 via the network NW1 based on an instruction of the processor CP2. The communication unit CP4 receives a control command of the monitoring camera 10 transmitted from outside (for example, client terminal 90), and transmits status information of the monitoring camera 10 to the outside (for example, client terminal 90).

The storage CP5 is configured using an external storage medium such as a semiconductor memory (for example, a flash memory) built in the monitoring camera 10 or a memory card (for example, an SD card) that is not built in the monitoring camera 10. The storage CP5 records the data of the captured video image generated by the processor CP2 in association with the identification information of the monitoring camera 10 and information of the capturing date and time. The storage CP5 always pre-buffers and holds the data of the captured video image for a predetermined time (for example, 30 seconds), and continues to accumulate the data of the captured video image up to a predetermined time (for example, 30 seconds) before the current time while overwriting the data of the captured video image. When the storage CP5 is configured by a memory card, the storage CP5 is detachably attached to a casing of the monitoring camera 10.

FIG. 3 is a block diagram illustrating an example of an internal configuration of each of the person retrieval server 50 and the client terminal 90. The person retrieval server 50, the face retrieval server 60, the client terminal 90, and the video image recorder 70 are all connected using an intranet such as a wired local area network (LAN) provided in a police station, but may be connected via a wireless network such as a wireless LAN.

The person retrieval server 50 is configured to include a communication unit 51, a memory 52, a processor PRC1, and storage 56. The processor PRC1 includes a person retrieval unit 53, a person analysis unit 54, and a person collation unit 55 as functional configurations obtained by executing a program stored in the memory 52. The processor PRC1 is configured using, for example, a CPU, a DSP, or an FPGA. The processor PRC1 functions as a control unit of the person retrieval server 50, and performs control processing for comprehensively controlling the operation of each unit of the person retrieval server 50 as a whole, data input and output processing with each unit of the person retrieval server 50, data arithmetic processing, and data storing processing. The processor PRC1 operates according to a program stored in the memory 52.

The communication unit 51 communicates with the monitoring cameras 10, 11, . . . connected via the network NW1 such as an intranet, and receives data of the captured video image sent from the monitoring cameras 10, 11, . . . . The communication unit 51 performs communicates with the client terminal 90 via a network NW2 such as an intranet provided in a police station, and receives a retrieval request for a person of interest (for example, a suspect such as an accident) sent from the client terminal 90, and transmits a response to the retrieval request.

The memory 52 is configured by using, for example, a RAM and a ROM, and temporarily stores a necessary for executing the operation of the person retrieval server 50, and information or data generated during the operation. The RAM is a work memory used when the processor PRC1 operates, for example. In the ROM, for example, a program for controlling the processor PRC1 is stored in advance. The memory 52 stores, for example, identification information (for example, a serial number) for identifying the person retrieval server 50 and various setting information.

The person retrieval unit 53 retrieves the data recorded in the storage 56 for a captured image in which a person (that is, a suspect) satisfying the retrieval feature (an example of a retrieval condition) included in the retrieval request is imaged, based on the retrieval request for suspect sent from the client terminal 90. When retrieving a person who satisfies the retrieval feature, the person retrieval unit 53 retrieves until a face image (for example, a face image of a person whose face is directed to the front direction) that is suitable for face image collation processing can be extracted. The person retrieval unit 53 extracts the retrieval result, and sends data of the extracted retrieval result to the client terminal 90 via the communication unit 51.

For example, each time the data of the captured video image from each of the monitoring cameras 10, 11, . . . is stored in the storage 56, the person analysis unit 54 analyzes the stored data of the captured video image. Specifically, the person analysis unit 54 analyzes information on a person (in other words, a person existing around a point where the monitoring camera is installed) reflected in the captured video image, and acquires the result as an analysis result. For example, when a whole body of a person from which a face image (see the above description) that is suitable for face image collation processing can be extracted in a captured image (frame) forming a captured video image, the person analysis unit 54 cuts out a whole body image in which the whole body of the person is imaged and a face image in which the face of the person is imaged, and generates the cut out whole body image and face image as an analysis result.

The person analysis unit 54 extracts, for example, appearance feature information such as gender, age, height, body type, clothing, possessions, wearing goods, manner of walking, and the moving direction (in other words, the passing direction) of the person when the person passes the installation point of the monitoring camera, and acquires the extracted appearance feature information and moving direction as an analysis result. The analysis processing of the information on the person may be executed in each monitoring camera. The person analysis unit 54 can determine the moving direction of the person based on, for example, a temporal difference between a plurality of captured images. The moving direction indicates, for example, in which direction the person has moved and passed the installation point (for example, a crosswalk) of the monitoring camera. The person analysis unit 54 associates the analysis result of the information on the person with the capturing date and time and the point (that is, the installation point of the monitoring camera) of the captured video image used for the analysis and records the analysis result and the capturing date and time and the point in an analysis information database 561 of the storage 56. In the accompanying drawings, "database" is abbreviated as "DB". With this configuration, the person retrieval server 50 can clearly determine what kind of person was present in the captured video image imaged at what point in time and at which monitoring camera installation point.

The person collation unit 55 registers the whole body image of the suspect sent from the client terminal 90 for the collation processing, and performs processing (that is, the collation processing) for determining whether or not a whole body image of a person who is the same as or similar to (in other words, matches) the registered whole body image is present in the captured video images sent from the monitoring cameras 10, 11, . . . . When specifying the whole body image of the same or similar person as the registered whole body image, the person collation unit 55 associates the specified whole body image with an alarm notification indicating that the suspect is found and sends the alarm notification to the client terminal 90.

The storage 56 is configured using, for example, a hard disk (HDD) or a solid state drive (SSD). The storage 56 records data of the captured video image sent from the monitoring cameras 10, 11, . . . in association with the identification information (in other words, the position information of the installation point of the monitoring camera) of the monitoring camera that has captured the captured video image and the information of the capturing date and time. The storage 56 also records road map information indicating the positions of the installation points of the respective monitoring cameras 10, 11, . . . and records the updated road map information each time the road map is updated, for example, by new construction or maintenance work of the road. The storage 56 records monitoring camera installation point data indicating the correspondence between each monitoring camera and the position of the installation point of the monitoring camera. In the monitoring camera installation point data, for example, identification information of the monitoring camera and position information (for example, latitude and longitude) of the installation point of the monitoring camera are associated with each other. Accordingly, the storage 56 records the data of the captured video image of the monitoring camera in association with information on the capturing date and time, monitoring camera information, and installation point information. The road map information is also recorded in the memory 95 of the client terminal 90.

The storage 56 includes the analysis information database 561 and a case database 562.

The analysis information database 561 stores the analysis result (see above description) of the person analysis unit 54. The analysis information database 561 may be referred to, for example, when the person retrieval unit 53 extracts a whole body image and a face image of a person who satisfies the retrieval feature included in the retrieval request of the person of interest such as a suspect, or when the person collation unit 55 performs the collation processing of the whole body image of the person of interest such as the suspect.

The case database 562, for each case such as an incident, case detailed information (for example, map data MP1, retrieval condition, and data of a whole body image in which the whole body in which the front face is imaged is cut) corresponding to the retrieval result of the person retrieval unit 53 is registered and stored, based on the date and time when the case occurred, sighting information such as a point, and the like, and the sighting information and a retrieval request for the person of interest from the client terminal 90. The case detail information includes, for example, case information such as the date and time and position of the case, a thumbnail image of the retrieved person, surrounding map information including the point where the case occurred, and the moving direction and passing time of a person when passing the installation point of the monitoring camera, comments such as user's notes. The case detailed information is not limited to the contents described above.

The client terminal 90 is configured to include an operation unit 91, a processor 92, a communication unit 93, a display 94, a memory 95, and storage 96. The client terminal 90 is used by a staff member (that is, a police officer who is a user) in a police station. When there is a phone call for notifying occurrence of the incident or the like by a witness or the like of the incident or the like, the user wears a headset HDS and answers the call. The headset HDS is used by being connected to the client terminal 90, and collects voices uttered by the user or outputs voices uttered by the other party (that is, a reporter).

The operation unit 91 is a user interface (UI) that detects a user's operation, and is configured using a mouse, a keyboard, or the like. The operation unit 91 outputs a signal based on the user's operation to the processor 92. For example, when the user wants to check the occurrence date and time of a case such as an incident to be examined by the user and the captured video image of the installation pint of the monitoring camera, the operation unit 91 receives an input of the retrieval condition including the date and time, the installation point, and the appearance retrieval feature of the person.

The processor 92 is configured using, for example, a CPU, a DSP, or an FPGA, functions as a control unit of the client terminal 90, and performs control processing for comprehensively controlling the operation of each unit of the client terminal 90 as a whole, data input and output processing, data arithmetic processing, and data storing with each unit of the client terminal 90. The processor 92 operates according to a program stored in the memory 95. The processor 92 uses the memory 95 during the operation, acquires current time information, and displays the retrieval result of the person of interest such as a suspect sent from the person retrieval server 50 or the face retrieval server 60, or the captured video image sent from the video image recorder 70 on the display 94. The processor 92 generates a retrieval request for a person of interest such as a suspect including the retrieval condition input by the operation unit 91, and transmits the retrieval request to the person retrieval server 50 or the face retrieval server 60 via the communication unit 93.

The communication unit 93 communicates with the person retrieval server 50, the face retrieval server 60, or the video image recorder 70 connected via the network NW2 such as an intranet. For example, the communication unit 93 transmits the retrieval request generated by the processor 92 to the person retrieval server 50 or the face retrieval server 60, or receives a retrieval result of a person of interest such as a suspect sent from the person retrieval server 50 or the face retrieval server 60. The communication unit 93 transmits an acquisition request of the captured video image generated by the processor 92 to the video image recorder 70, and receives the captured video image sent from the video image recorder 70 corresponding to the acquisition request.

The display 94 is configured using a display device such as a liquid crystal display (LCD) or an organic electroluminescence (EL), and displays various data sent from the processor 92.

The memory 95 is configured by using, for example, a RAM and a ROM, and temporarily stores a necessary for executing the operation of the client terminal 90, and information or data generated during the operation. The RAM is a work memory used when the processor 92 operates, for example. In the ROM, for example, a program for controlling the processor 92 is stored in advance. The memory 95 stores, for example, identification information (for example, a serial number) for identifying the client terminal 90 and various setting information.

The storage 96 is configured using, for example, a hard disk or a solid state drive. The storage 96 also records road map information indicating the positions of the installation points of the respective monitoring cameras 10, 11, . . . and records the updated road map information each time the road map is updated, for example, by new construction or maintenance work of the road. The storage 96 records monitoring camera installation point data indicating the correspondence between each monitoring camera and the position of the installation point of the monitoring camera. In the monitoring camera installation point data, for example, identification information of the monitoring camera and position information (for example, latitude and longitude) of the installation point of the monitoring camera are associated with each other. Accordingly, the storage 96 records the data of the captured video image of the monitoring camera in association with information on the capturing date and time, monitoring camera information, and installation point information.

Figure 4:
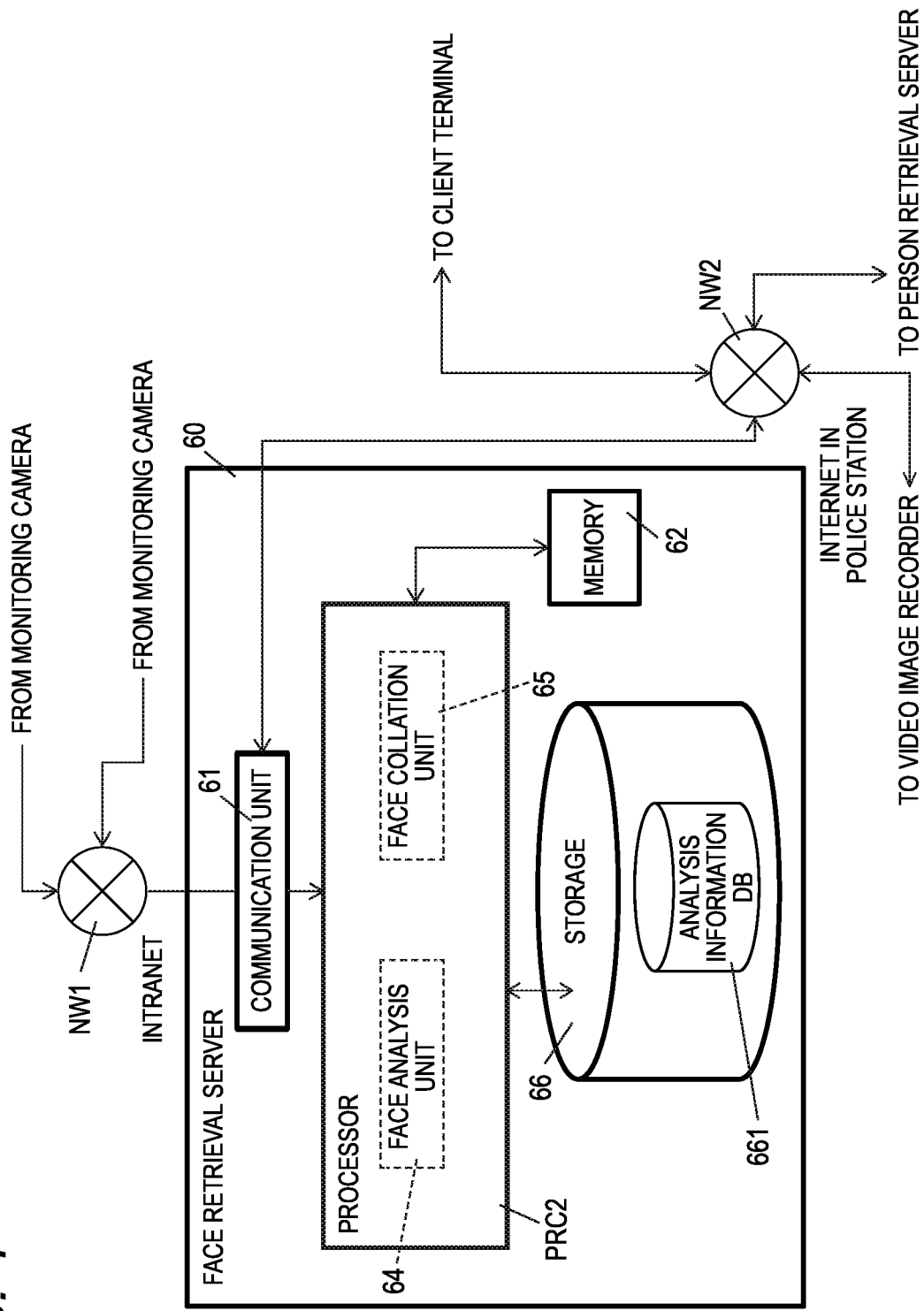
FIG. 4 is a block diagram illustrating an example of an internal configuration of a face retrieval server.

FIG. 4 is a block diagram illustrating an example of the internal configuration of the face retrieval server 60. The face retrieval server 60 is configured to include a communication unit 61, a memory 62, a processor PRC2, and storage 66. The processor PRC2 includes a face analysis unit 64 and a face collation unit 65 as functional configurations obtained by executing a program stored in the memory 62. The processor PRC2 is configured using, for example, a CPU, a DSP, or an FPGA. The processor PRC2 functions as a control unit of the face retrieval server 60, and performs control processing for comprehensively controlling the operation of each unit of the face retrieval server 60 as a whole, data input and output processing with each unit of the face retrieval server 60, data arithmetic processing, and data storing processing. The processor PRC2 operates according to a program stored in the memory 62.

The communication unit 61 communicates with the monitoring cameras 10, 11, . . . connected via the network NW1 such as an intranet, and receives data of captured video image sent from the monitoring cameras 10, 11, . . . . The communication unit 61 performs communicates with the client terminal 90 via the network NW2 such as an intranet provided in a police station, and receives a request for execution of the collation processing of the face of a person of interest sent from the client terminal 90, and transmits a response to the collation processing.

The memory 62 is configured using, for example, a RAM and a ROM, and temporarily stores a necessary for executing the operation of the face retrieval server 60, and information or data generated during the operation. The RAM is a work memory used when the processor PRC2 operates, for example. In the ROM, for example, a program for controlling the processor PRC2 is stored in advance. The memory 62 stores, for example, identification information (for example, a serial number) for identifying the face retrieval server 60 and various setting information.

For example, each time the data of the captured video image from each of the monitoring cameras 10, 11, . . . is stored in the storage 66, the face analysis unit 64 analyzes the stored data of the captured video image. Specifically, the face analysis unit 64 analyzes information on a face of a person (in other words, a person existing around a point where the monitoring camera is installed) reflected in the captured video image, and acquires the result as an analysis result. For example, when a face image (see the above description) that is suitable for face image collation processing can be specified in a captured image (frame) forming a captured video image, the face analysis unit 64 cuts out the face image, and generates the cuts out face image as an analysis result. The face analysis unit 64 extracts, for example, appearance feature information and the moving direction (in other words, the passing direction) of the person when the person passes the installation point of the monitoring camera, and acquires the extracted appearance feature information and moving direction as an analysis result. The analysis processing of the information on the face may be executed in each monitoring camera. The face analysis unit 64 can determine the moving direction of the person based on, for example, a temporal difference between a plurality of captured images. The moving direction indicates, for example, in which direction the person has moved and passed the installation point (for example, a crosswalk) of the monitoring camera. The face analysis unit 64 associates the analysis result of the information on the face of the person with the capturing date and time and the point (that is, the installation point of the monitoring camera) of the captured video image used for the analysis and records the analysis result and the capturing date and time and the point in the analysis information database 661 of the storage 66. With this configuration, the face retrieval server 60 can clearly determine what kind of person was present in the captured video image imaged at what point in time and at which monitoring camera installation point.

The face collation unit 65 registers the face image of the suspect sent from the client terminal 90 for the collation processing, and performs processing (that is, the collation processing) for determining whether or not a face image of a person who is the same as or similar to (in other words, matches) the registered face image is present in the captured video images sent from the monitoring cameras 10, 11, . . . . When specifying the face image of the same or similar person as the registered face image, the face collation unit 65 associates the specified face image with an alarm notification indicating that the suspect is found and sends the alarm notification to the client terminal 90.

The storage 66 is configured using, for example, a hard disk (HDD) or a solid state drive (SSD). The storage 66 records data of the captured video image sent from the monitoring cameras 10, 11, . . . in association with the identification information (in other words, the position information of the installation point of the monitoring camera) of the monitoring camera that has captured the captured video image and the information of the capturing date and time. The storage 66 also records road map information indicating the positions of the installation points of the respective monitoring cameras 10, 11, . . . and records the updated road map information each time the road map is updated, for example, by new construction or maintenance work of the road. The storage 66 records monitoring camera installation point data indicating the correspondence between each monitoring camera and the position of the installation point of the monitoring camera. In the monitoring camera installation point data, for example, identification information of the monitoring camera and position information (for example, latitude and longitude) of the installation point of the monitoring camera are associated with each other. Accordingly, the storage 66 records the data of the captured video image of the monitoring camera in association with information on the capturing date and time, monitoring camera information, and installation point information.

The storage 66 includes the analysis information database 661.

The analysis information database 661 stores the analysis result (see above description) of the face analysis unit 64. The analysis information database 661 may be referred to, for example, when the face collation unit 65 performs the collation processing of the face image of the person of interest such as the suspect.

Figure 5:
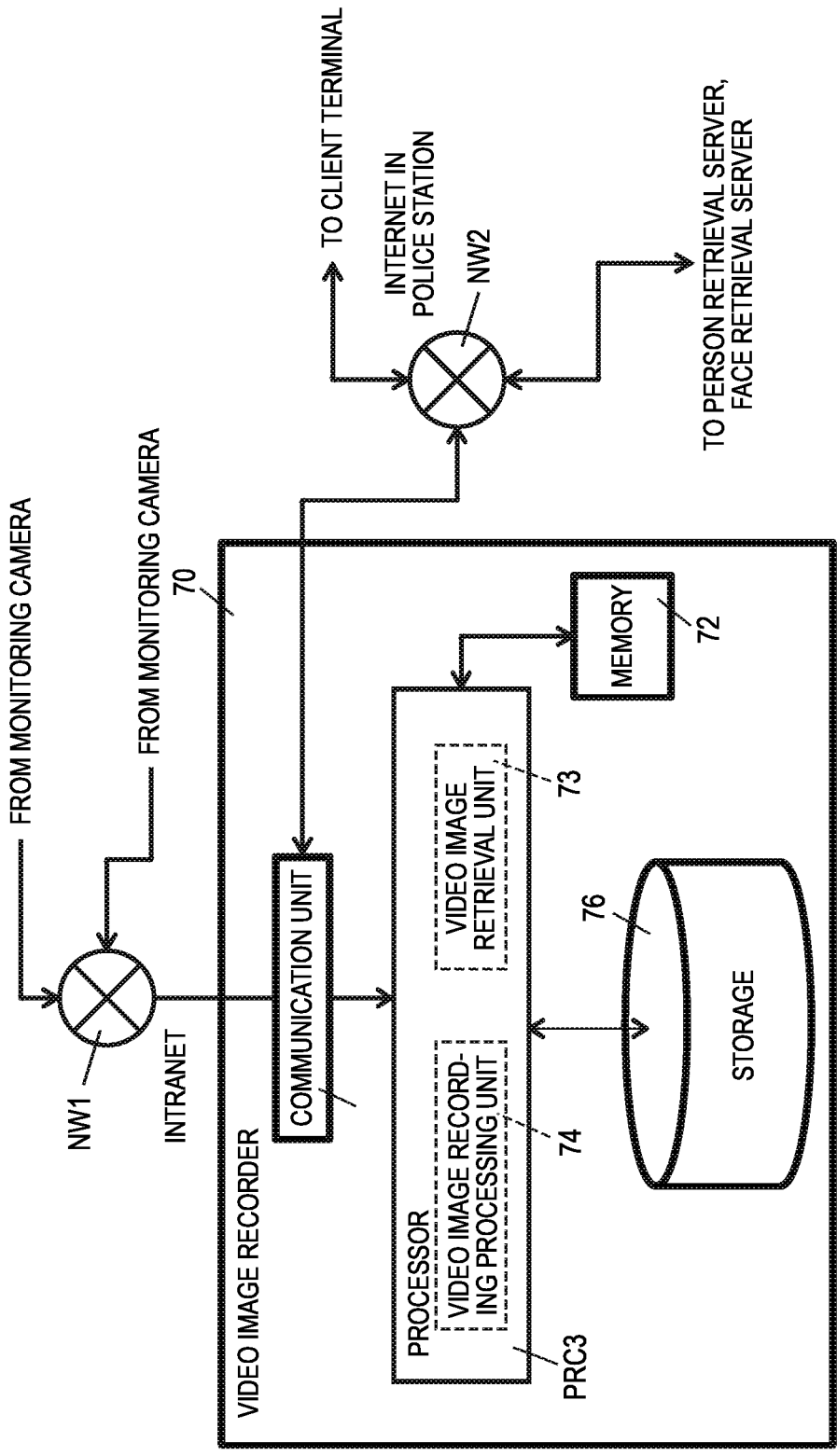
FIG. 5 is a block diagram illustrating an example of an internal configuration of a video image recorder.

FIG. 5 is a block diagram illustrating an example of an internal configuration of the video image recorder 70. The video image recorder 70 is communicably connected to each of the monitoring cameras 10, 11, . . . via the network NW1 such as an intranet, and is communicably connected to the person retrieval server 50, the face retrieval server, 60 and the client terminal 90 via the network NW2 such as the Internet.

The video image recorder 70 is configured to include a communication unit 71, a memory 72, a processor PRC3, and storage 75. The processor PRC3 includes a video image retrieval unit 73 and a video image recording processing unit 74 as functional configurations obtained by executing a program stored in the memory 72. The processor PRC3 is configured using, for example, a CPU, a DSP, or an FPGA. The processor PRC3 functions as a control unit of video image recorder 70, and performs control processing for comprehensively controlling the operation of each unit of the video image recorder 70 as a whole, data input and output processing with each unit of the video image recorder 70, data arithmetic processing, and data storing processing. The processor PRC3 operates according to a program stored in memory 72.

The communication unit 71 communicates with the monitoring cameras 10, 11, . . . connected via the network NW1 such as an intranet, and receives data of the captured video image sent from the monitoring cameras 10, 11, . . . . The communication unit 71 performs communicates with the client terminal 90 via the network NW2 such as an intranet provided in a police station, and receives a video image request sent from the client terminal 90, and transmits a response to the video image request.

The memory 72 is configured using, for example, a RAM and a ROM, and temporarily stores a necessary for executing the operation of the video image recorder 70, and information or data generated during the operation. The RAM is a work memory used when the processor PRC3 operates, for example. In the ROM, for example, a program and data for controlling the processor PRC3 is stored in advance. The memory 72 stores, for example, identification information (for example, a serial number) for identifying the video image recorder 70 and various setting information.

The video image retrieval unit 73 extracts the captured video image of the monitoring camera that matches a video image request by retrieving the storage 76, based on the video image request sent from the client terminal 90. The video image retrieval unit 73 sends data of the extracted captured video image to the client terminal 90 via the communication unit 71.

The video image recording processing unit 74 records the received captured video image data in the storage 76 each time data of the captured video image from each of the monitoring cameras 10, 11, . . . is received by the communication unit 71, for example.

The storage 76 is configured using a hard disk or a solid state drive, for example. The storage 76 records data of the captured video image sent from the monitoring cameras 10, 11, . . . in association with the identification information (in other words, the position information of the installation point of the monitoring camera) of the monitoring camera that has captured the captured video image and the information of the capturing date and time.

Next, various screen examples displayed on the display 94 of the client terminal 90 during a police investigation will be described with reference to FIGS. 6 to 10. In the description of FIGS. 6 to 10, the same elements as those illustrated in the drawings are referred to with the same reference numerals, and descriptions thereof are simplified or omitted.

In the police investigation, the client terminal 90 has activated and is executing a person monitoring application (hereinafter, referred to as "person monitoring application") installed in advance by a policeman (an example of a user). The program and data of the person monitoring application are stored in the ROM of the memory 95 of the client terminal 90. The person monitoring application is activated and executed by the processor 92 by a policeman's operation. Various data or information created by the processor 92 during activation of the person monitoring application is temporarily stored in the RAM of the memory 95.

Figure 6:
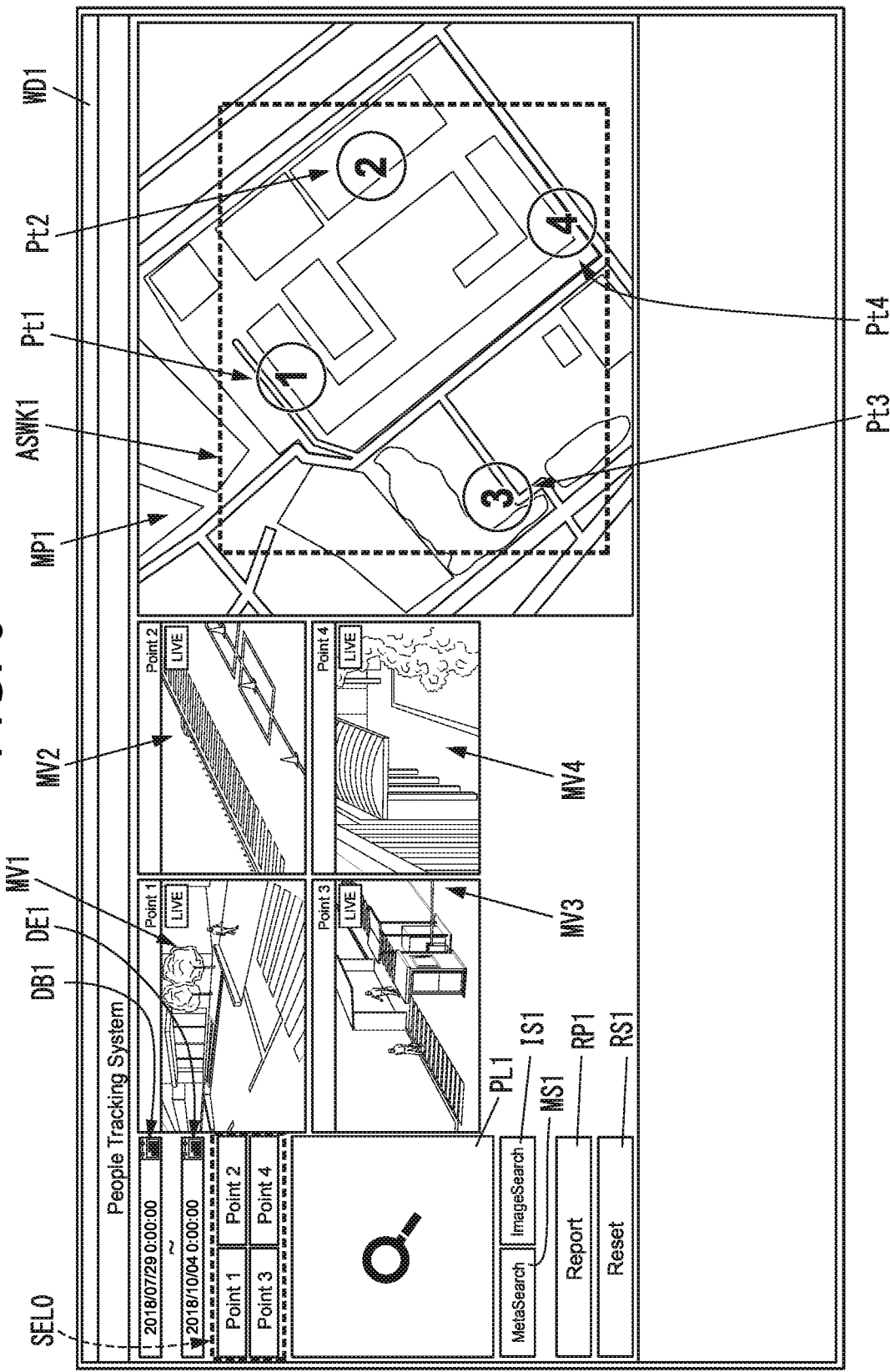
FIG. 6 is a diagram illustrating an example of a person monitoring screen displaying map data including a point where a monitoring camera is installed.

FIG. 6 is a diagram illustrating an example of a person monitoring screen WD1 that displays map data including a point where a monitoring camera is installed. The processor 92 displays the person monitoring screen WD1 on the display 94 after the activation of the person monitoring application by a user's operation. The person monitoring screen WD1 has a configuration in which both map data MP1 corresponding to the road map information recorded in the storage 96 of the client terminal 90 and a plurality of retrieval condition input fields are displayed side by side. In the following description, the person monitoring application executed by the processor 92 communicates with the person retrieval server 50, the face retrieval server 60, or the video image recorder 70 during the execution.

On the map data MP1, an icon Pt1 indicating an installation point of a first monitoring camera, an icon Pt2 indicating an installation point of a second monitoring camera, an icon Pt3 indicating an installation point of a third monitoring camera, and an icon Pt4 indicating an installation point of a fourth monitoring camera, that are installed in a facility (for example, a site of a shopping center), are illustrated in a distinguishable manner. In the following description, "4" is exemplified as a parameter n (n is an integer of 2 or more) indicating the number of monitoring cameras installed. The first monitoring camera, the second monitoring camera, the third monitoring camera, and the fourth monitoring camera all have the same configuration as each of the monitoring cameras 10, 11, . . . illustrated in FIG. 2.

The person monitoring application displays a camera selection frame ASWK1 on the map data MP1 by a user's operation. The camera selection frame ASWK1 is used for selecting captured video images MV1, MV2, MV3, and MV4 (for example, live video images) of the monitoring camera displayed on the person monitoring screen WD1. In FIG. 6, four of the first to fourth monitoring cameras are selected in the camera selection frame ASWK1 by a user's operation. The person monitoring application displays a point selection frame SEL0, which indicates that the installation point of the monitoring camera (specifically, the first to fourth monitoring cameras) selected by the camera selection frame ASWK1 is a display target of the captured video image on the person monitoring screen WD1, on the person monitoring screen WD1. The camera selection frame ASWK1 is rectangular in FIG. 6, but is not limited to this shape, and may be any of various well-known shapes such as a circle, an ellipse, and a triangle.

As illustrated in FIG. 6, n (=4) monitoring cameras have already been selected in the map data MP1 by the camera selection frame ASWK1, by the user's operation. The person monitoring application may display modes of the icons Pt1 to Pt4 so that the icons Pt1 to Pt4 are easier to identify than the icons of the monitoring cameras that are not selected, in order to indicate that the icons have been selected by the camera selection frame ASWK1. For example, the person monitoring application displays the icons Pt1 to Pt4 in a specific color (for example, red), and "Point1", "Point2", "Point3", and "Point4" that respectively correspond to the first to fourth monitoring cameras in the point selection frame SEL0 so as to be easily identified.

The person monitoring application displays, on the person monitoring screen WD1, the screen of the captured video images MV1, MV2, MV3, and MV4 (live video images) of the monitoring cameras installed on the icons Pt1, Pt2, Pt3, and Pt4 (in other words, "Point1", "Point2", "Point3", and "Point4"), together with the capturing time and the capturing position name. In FIG. 6, illustration of the capturing time and the capturing point name is omitted in each screen of the captured video images MV1 to MV4.

The person monitoring application displays various buttons on the person monitoring screen WD1 to support in retrieving a person of interest such as a suspect in a police investigation. For example, a period start button DB1 for selecting the start date and time of a retrieval target period, a period end button DE1 for selecting the end date and time of the retrieval target period, and a retrieval target person image display frame PL1 indicating an appearance image of the suspect to be retrieved are disposed.

The person monitoring application can cause the person retrieval server 50 to execute a retrieval request of two types of retrieval methods in retrieving a suspect. The first retrieval method is a meta retrieval, and is, for example, a method of retrieving a suspect having a feature point in which similarity of feature points on a captured image corresponding to meta information is the same or equal to or greater than a threshold value, for example, based on the meta information set on a detailed setting screen DTL1 illustrated in FIG. 7. The person monitoring application displays a meta retrieval button MS1 for requesting the meta retrieval to the person retrieval server 50 on the person monitoring screen WD1. The second retrieval method is image retrieval, and is, for example, a method of retrieving a suspect having a feature point in which similarity of feature points on a captured image of an image data is the same or equal to or greater than a threshold value, for example, based on the image data of a thumbnail image Xpc1 selected in FIG. 8. The person monitoring application displays an image retrieval button IS1 for requesting the image retrieval to the person retrieval server 50 on the person monitoring screen WD1.

The person monitoring application may generate a retrieval request for retrieval using both the first retrieval method and the second retrieval method, and cause the person retrieval server 50 to execute the retrieval.

The person monitoring application displays a report button RP1, which is for storing data of a retrieval result of the suspect on the person monitoring screen WD1, on the person monitoring screen WD1 as a case report. When the report button RP1 is pressed by a user's operation, the person monitoring application stores data of the retrieval result (for example, map data MP1, retrieval conditions such as date, user comments, and cut-out thumbnail image data, see FIG. 10) of at least one suspect displayed on the person monitoring screen WD1 in the storage 96 as a case report. The client terminal 90 may send the case report data to the person retrieval server 50 in association with identification information (for example, a file name) of the case report. The person retrieval server 50 stores the case report data associated with the identification information (for example, the file name) of the case report in a case DB 562.

The person monitoring application displays a reset button RS1, which is for returning the displayed person monitoring screen WD1 to an initial state (in other words, before starting retrieval of the suspect) of the person monitoring screen WD1, on the person monitoring screen WD1. With this configuration, the user can easily restart the retrieval of the suspect from the beginning, for example, when the user performs an incorrect operation when retrieving the suspect on the person monitoring screen WD1.

Figure 7:
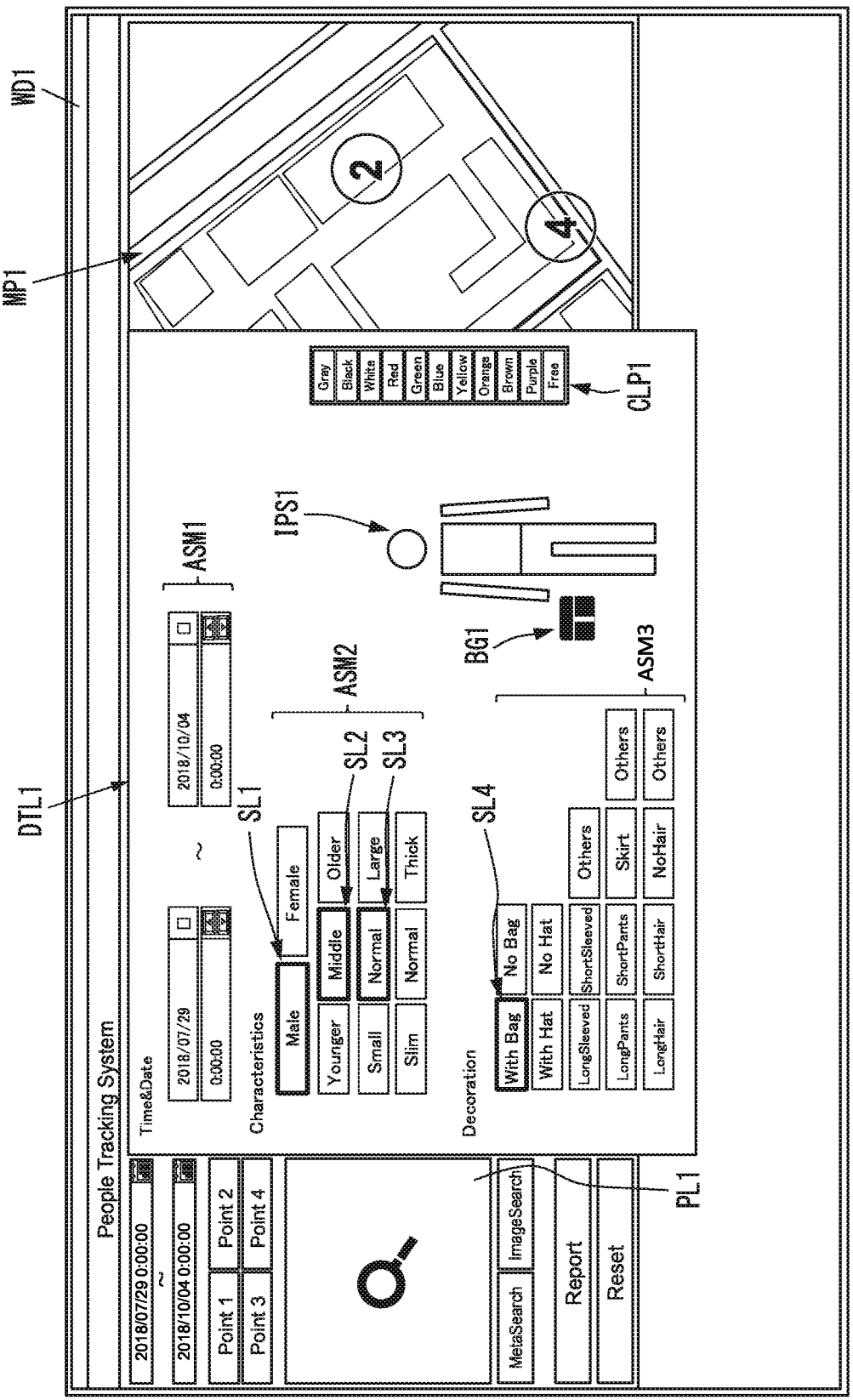
FIG. 7 is a diagram illustrating an example of a detailed setting screen of retrieval feature of a suspect.

FIG. 7 is a diagram illustrating an example of a detailed setting screen DTL1 of retrieval feature of a suspect. The person monitoring application displays a detailed setting screen DTL1 that allows the user to mainly set the date ASM1 (Time & Date), the feature ASM2 (Characteristics), and the clothing ASM3, (Decoration), as three major elements of the retrieval condition for retrieving a suspect by a predetermined user's operation, on the person monitoring screen WD1. The person monitoring application displays a retrieval target person image IPS1 specified by respective settings of the feature ASM2 and the clothing ASM3 by a user operation on the detailed setting screen DTL1. With this configuration, the user can visually grasp the retrieval target person image IPS1 corresponding to each of the feature ASM2 and the clothing ASM3 set by himself or herself, and can easily judge whether or not his or her own settings are appropriate. For example, in FIG. 7, a person image having a black bag BG1 satisfying the feature ASM2 and the clothing ASM3 during the period specified by the date ASM1 is selected as the suspect, in the retrieval target person image IPS1.

In the date ASM1, the start date and time and the end date and time of the suspect retrieval period are set. For example, the date ASM1 is input by a user's operation. With this configuration, the start date and time and the end date and time of the suspect retrieval period can be easily set by the user's operation. For example, in FIG. 7, "00:00:00 a.m. on Jul. 29, 2018" to "00:00:00: a.m. On Oct. 4, 2018" are input as the date ASM1.

In the feature ASM2, options of information on the appearance of the suspect are displayed in a selectable manner. The displayed options include options related gender (specifically, "Male" or "Female"), options related to age (specifically, "Younger", "Middle", or "Older"), options related to height (specifically, "Small", "Normal" or "Large"), and options related to body type (specifically, "Slim", "Normal" or "Thick"). With this configuration, the user can finely set the appearance features such as gender, age, height, and body type of the suspect. For example, in FIG. 7, as the feature ASM2, an option SL1 of "Male", an option SL2 of "Older", and an option SL3 of "Slim" are selected.

In the clothing ASM3, options of information on the appearance of the suspect are displayed in a selectable manner. The options displayed are options related to possessions (specifically, "With Bag" or "No Bag"), options related to wearing goods (specifically, "With Hat" or "No Hat"), options related to upper body clothing (specifically, "Long Sleeved", "Short Sleeved" or "Others"), options related to lower body clothing (specifically, "Long Pants", "Short Pants", "Skirt", or "Others"), hairstyle options (specifically, "Long Hair", "Short Hair", "No Hair" or "Others"). A palette CLP1 from which colors can be selected for clothing, possessions, and wearing goods is provided on the detailed setting screen DTL1. For example, colors can be selected from Gray, Black, White, Red, Green, Blue, Yellow, Orange, Brown, Purple, and other colors (Free). With this configuration, the user can finely select the appearance features of the suspect's clothing and the like. For example, in FIG. 7, the option SL4 of "holding a bag (With Bag)" is selected as the clothing ASM3.

Figure 8:
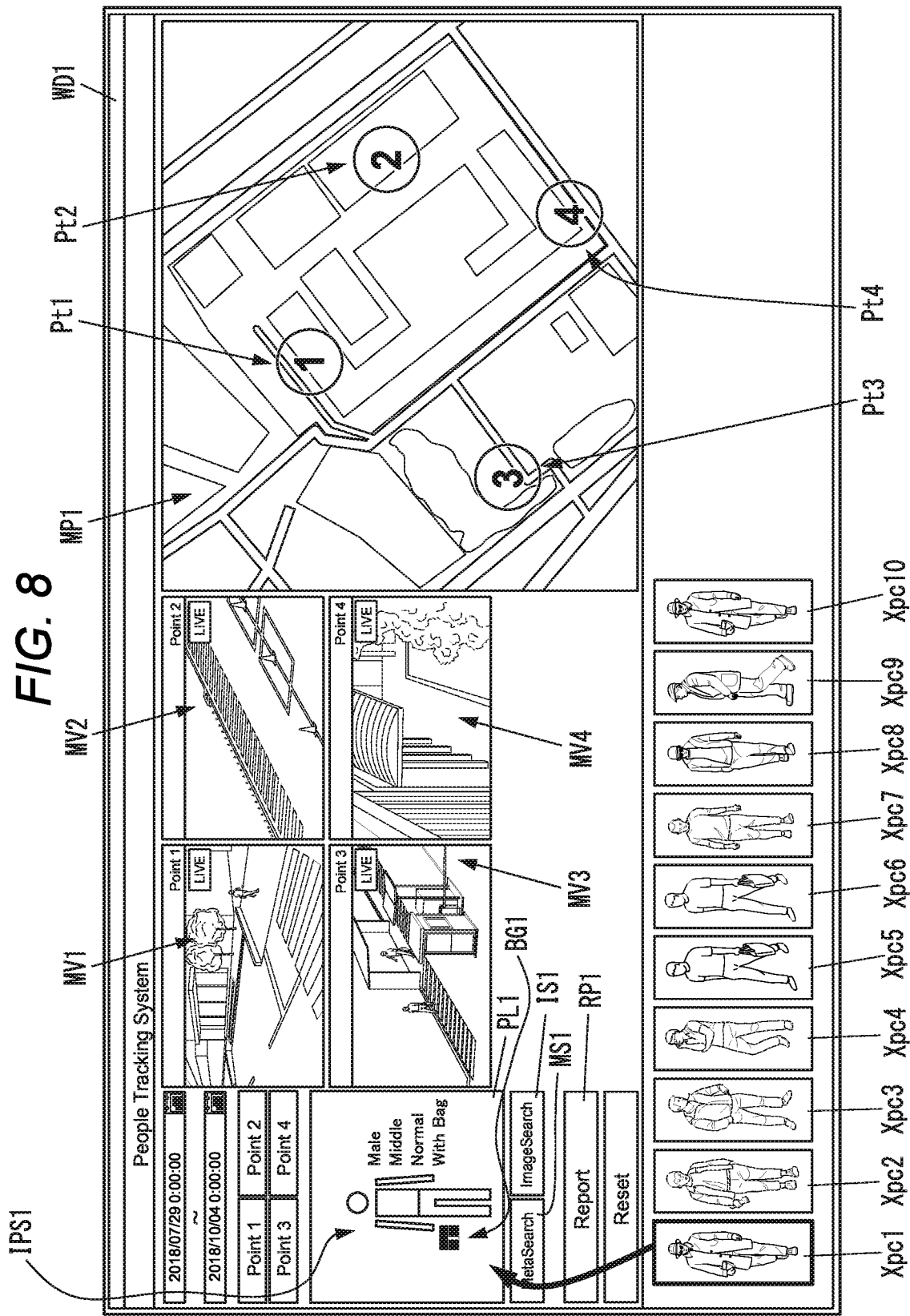
FIG. 8 is a diagram illustrating an example of a person monitoring screen which displays person retrieval results, in time series, by meta retrieval using the retrieval feature set on the detailed setting screen of FIG. 7 as a retrieval condition.

FIG. 8 is a diagram illustrating an example of the person monitoring screen WD1 that displays person retrieval results, in time series, by meta retrieval using the retrieval features set on the detailed setting screen DTL1 of FIG. 7 as retrieval conditions. The person monitoring application displays the retrieval target person image IPS1 selected on the detailed setting screen DTL1 illustrated in FIG. 7 and text of some retrieval conditions in the retrieval target person image display frame PL1.

The person monitoring application detects that the meta retrieval button MS1 has been pressed by a user's operation while the retrieval target person image IPS1 is displayed in the retrieval target person image display frame PL1. In this case, the person monitoring application generates a retrieval request for a suspect including various retrieval features (see FIG. 7) for specifying the retrieval target person image IPS1 displayed in the retrieval target person image display frame PL1 and identification information of the monitoring camera to be retrieved transmits the retrieval request to the person retrieval server 50 via the communication unit 93. When receiving the retrieval request sent from the client terminal 90, the person retrieval server 50 retrieves a person (for example, a person with similarity equal to or greater than a predetermined threshold value) who is the same as or similar to the suspect who satisfies the retrieval conditions by meta retrieval, using the analysis results stored in the analysis information database 561 of the storage 56. The person retrieval server 50 sends the retrieval result to the client terminal 90.

When the retrieval result received via the communication unit 93 is acquired, the person monitoring application displays thumbnail images Xpc1, Xpc2, Xpc3, Xpc4, Xpc5, Xpc6, Xpc7, Xpc8, Xpc9, and Xpc10, which are obtained by cutting out the same or similar person as the suspect (that is, the retrieval target person image IPS1), side by side.

For example, the person monitoring application may display the thumbnail images Xpc1 to Xpc10 of the same or similar person as the suspect (that is, the retrieval target person image IPS1) in the same or similar order as the retrieval target person image IPS1. With this configuration, the user can find the suspect who he/she wants to grasp at an early stage by preferentially checking the displayed thumbnail image.

For example, the person monitoring application may display the thumbnail images Xpc1 to Xpc10 of the same or similar person as the suspect (that is, the retrieval target person image IPS1) in time series in the order of the capturing time when the respective thumbnail images were captured (for example, in the order of oldest or newest capturing time). With this configuration, the user can find the suspect who he or she wants to grasp at an early stage by preferentially checking the thumbnail images displayed in the order of oldest or newest capturing time.

For example, the person monitoring application may collectively display the thumbnail images Xpc1 to Xpc10 of the same or similar person as the suspect (that is, the retrieval target person image IPS1) for each monitoring camera installation point corresponding to each of the thumbnail images. With this configuration, when the user grasps the installation point of the monitoring camera in which the suspect may exist, and the like, the user can find the suspect who he or she wants to grasp at an early stage by preferentially checking one or a plurality of thumbnail images collectively displayed corresponding to the corresponding installation point.

Here, it is assumed that the user notices that the person of the thumbnail image Xpc1 may be the suspect among the plurality of thumbnail images Xpc1 to Xpc10. When the thumbnail image Xpc1 is selected and moved to the retrieval target person image display frame PL1 and the image retrieval button IS1 is pressed by the user's operation, the person monitoring application sends a retrieval request for a person who is the same as or similar to the person in the thumbnail image Xpc1 to the person retrieval server 50. Similarly, the person retrieval server 50 retrieves (image retrieval) a person who is the same as or similar to the person in the thumbnail image Xpc1 according to the retrieval request sent from the client terminal 90, and sends the retrieval result to the client terminal 90.

Figure 9:
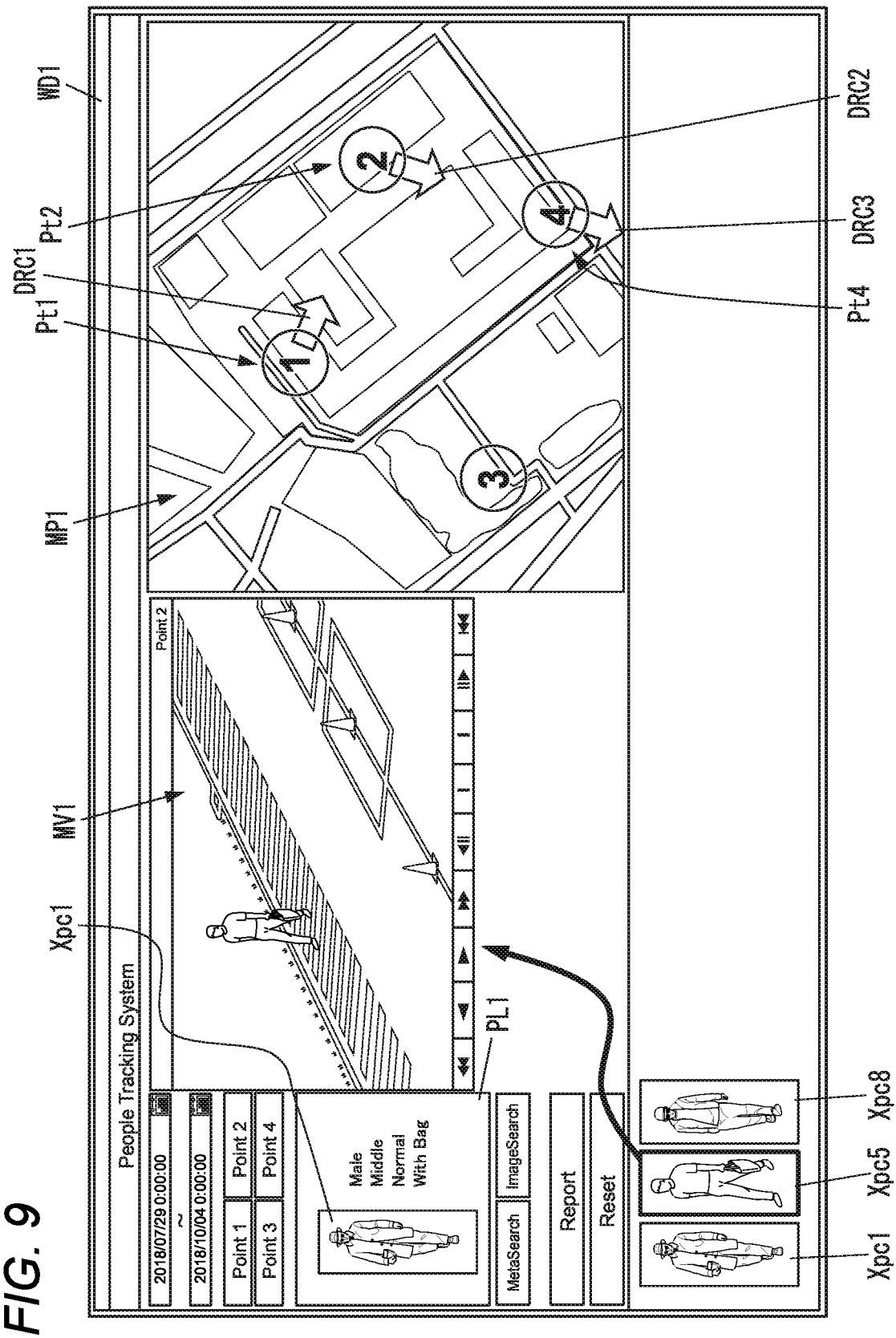
FIG. 9 is a diagram illustrating an example of a person monitoring screen that displays person retrieval results, in time series, by image retrieval using a thumbnail image Xpc1 of FIG. 8 as a retrieval condition.

FIG. 9 is a diagram illustrating an example of the person monitoring screen WD1 for displaying person retrieval results, in time series, by image retrieval using the thumbnail image Xpc1 of FIG. 8 as a retrieval condition. The person monitoring application displays the thumbnail images Xpc1, Xpc5, and Xpc8 corresponding to three persons side by side on the person monitoring screen WD1 as retrieval results of the image retrieval described above that are the same as or similar to the person of the thumbnail image Xpc1. In FIG. 8, when the thumbnail image Xpc1 is moved to the retrieval target person image display frame PL1 by a user's operation, the person monitoring application may use (that is, both meta retrieval and image retrieval are used) a part of the text (for example, "Male", "Middle", "Normal", "With Bag") of the meta information used as the retrieval feature of the retrieval (meta retrieval) before the movement at the time of the image retrieval, or may simply perform an image retrieval for retrieval based on the similarity between images.

Here, it is assumed that the user is concerned about the person of the thumbnail image Xpc5 among the plurality of thumbnail images Xpc1, Xpc5, and Xpc8. When the thumbnail image Xpc5 is pressed by a user's operation, the person monitoring application displays a captured video image reproduction screen capable of reproducing the captured video image MV1 (that is, the captured video image of the monitoring camera at the time when the person of the thumbnail image Xpc5 is captured) corresponding to the pressed thumbnail image Xpc5. The person monitoring application disposes and displays icons for receiving various user's operations such as "play", "pause", "fast forward", "fast rewind", "return to first", "next" on the reproduction screen.

The person monitoring application superimposes and displays the moving direction when the person of the thumbnail image Xpc5 has passed the installation points of the first to fourth monitoring cameras on the map data MP1 in conjunction with the display of the reproduction screen of the captured video image MV1 (see FIG. 9). For example, the person monitoring application superimposes and displays a direction DRC1 of the installation point of the monitoring camera indicated by the icon Pt1, a direction DRC2 of the installation point of the monitoring camera indicated by the icon Pt2, and a direction DRC3 of the installation point of the monitoring camera indicated by the icon Pt4 on the map data MP1. With this configuration, a moving direction when a person (for example, the suspect) concerned by the user himself or herself passes the installation point of the monitoring camera is indicated on the map data MP1, and thus the user can visually and easily grasp the moving direction (in other words, the escape direction or escape route) of the person of interest (for example, the suspect).

The person monitoring application may superimpose and display the moving direction when the person of the pressed thumbnail image passes each of the first to fourth monitoring camera installation points on the map data MP1, not only in conjunction with the display of the reproduction screen of the captured video image MV1 but also when, for example, any one of the thumbnail images in FIG. 8 is pressed by a user's operation. With this configuration, the client terminal 90 can display the escape direction of the person (for example, the suspect) of the thumbnail image designated by the user's operation on the map data MP1 in both the image retrieval and the meta retrieval, and thus the client terminal 90 can effectively support early detection of a person of interest such as a suspect.

Figure 10:
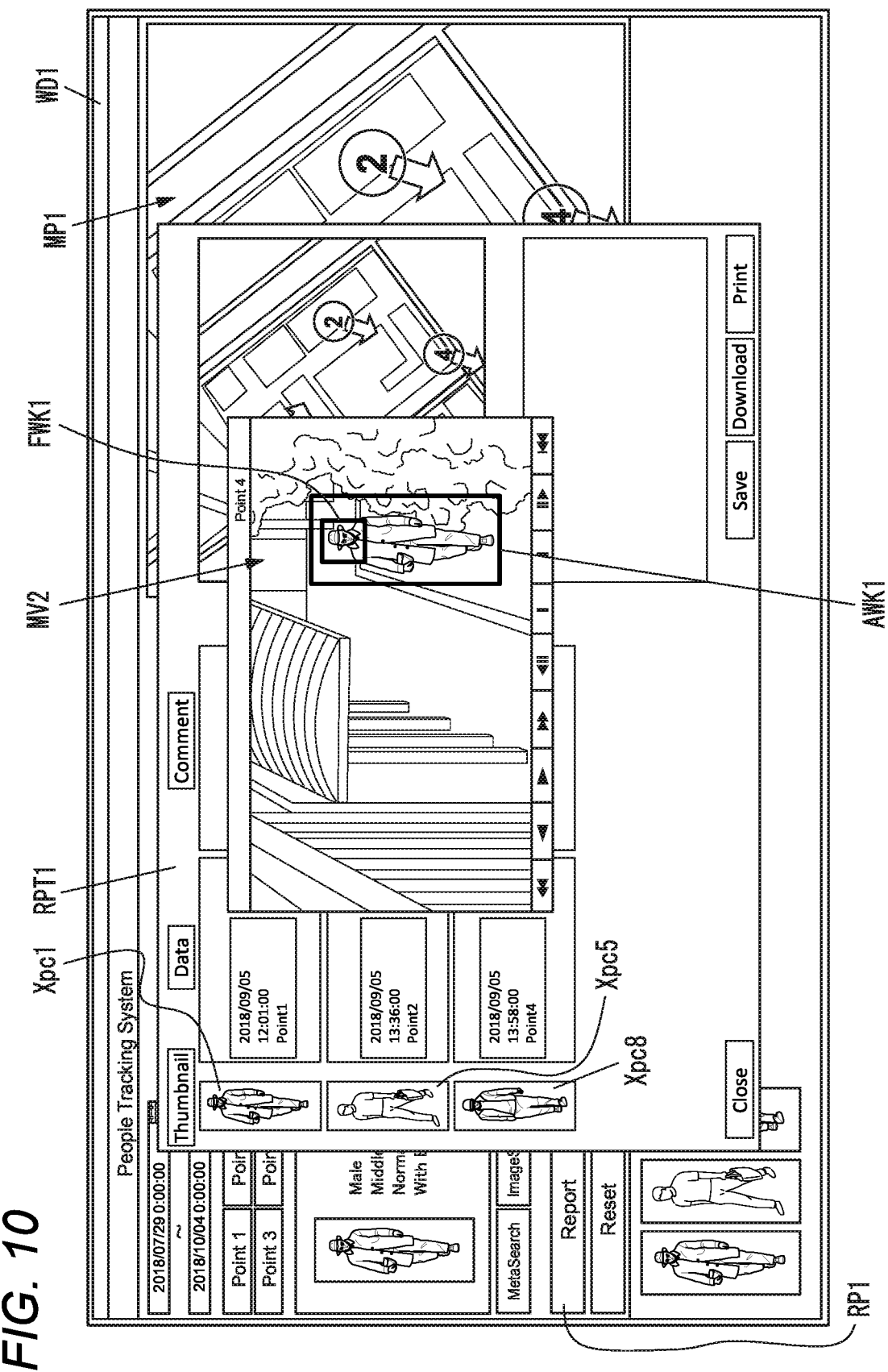
FIG. 10 is a diagram illustrating an example of a person monitoring screen on which a captured video image repro-
duction screen of a person corresponding to the thumbnail image Xpc1 selected from a report screen is superimposed.

FIG. 10 is a diagram illustrating an example of a person monitoring screen WD1 on which a captured video image playback screen of a person corresponding to the thumbnail image Xpc1 selected from the report screen RPT1 is superimposed. When the report button RP1 is pressed by a user operation, the person monitoring application superimposes and displays the report screen RPT1 illustrated in FIG. 10 on the person monitoring screen WD1. The report screen RPT1 includes, for example, at least one or more thumbnail images Xpc1, Xpc5, and Xpc8 displayed side by side on the person monitoring screen WD1 (for example, see FIG. 9) immediately before the report button RP1 is pressed, data on each of the thumbnail images (for example, the date and time when the thumbnail image was captured, the installation point of the monitoring camera), a comment such as a memo of a user, and map data are disposed on the screen.

Here, when the thumbnail image Xpc8 of a report screen RPT1 is pressed by a user's operation, the person monitoring application displays a captured video reproduction screen capable of reproducing the captured video image MV2 (that is, the captured video image of the monitoring camera at the time when the person of the thumbnail image Xpc8 is imaged) corresponding to the thumbnail image Xpc8. In this captured video image reproduction screen, the substantially whole body of the person of the thumbnail image Xpc8 is directed to the front direction and the face of the person is also directed to the front direction to the extent that the user can distinguish the face. In the captured video image reproduction screen illustrated in FIG. 9 and the captured video image reproduction screen illustrated in FIG. 10 as well, the person monitoring application superimposes and displays a face frame FWK1 indicating the face of the person reflected in the captured video image being reproduced, and may also superimpose and display a whole body frame AWK1 indicating the whole body of the same person. With this configuration, the user can instantly determine the face and the whole body of the person reflected in the captured video image being reproduced, and can grasp the features of the person who can be the suspect at an early stage.

Figure 11:
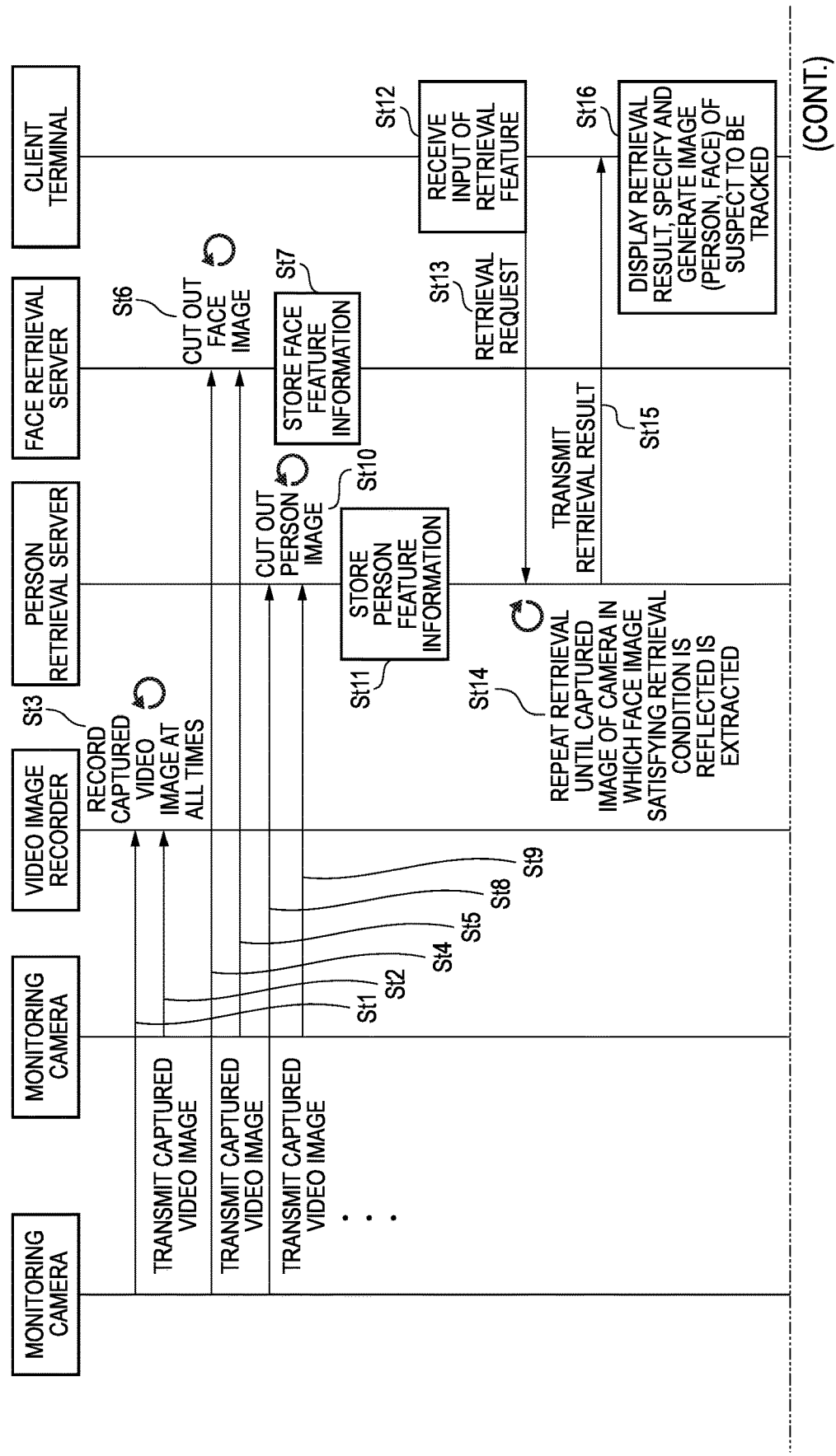
FIG. 11 is a sequence diagram illustrating an example of an operation procedure of the person monitoring system according to Embodiment 1.

Next, an operation procedure of the person monitoring system 1 according to Embodiment 1 will be described with reference to FIG. 11. FIG. 11 is a sequence diagram illustrating an example of an operation procedure of the person monitoring system 1 according to Embodiment 1. In FIG. 11, two monitoring cameras (for example, the monitoring camera C1 installed at the point of the icon Pt1 and the monitoring camera C2 installed at the point of the icon Pt2 in FIG. 6) are illustrated, but three or more monitoring cameras may be illustrated.

In FIG. 11, the monitoring camera C1 constantly performs capturing while the power is on, and sends data of the captured video image to the video image recorder 70 (St1). Similarly, the monitoring camera C2 constantly performs capturing while the power is on, and sends data of the captured video image to the video image recorder 70 (St2). The video image recorder 70 records (records) data of the captured video image) sent from each of the monitoring cameras C1 and C2 at all times (St3).

The monitoring camera C1 sends data of the captured video image to the face retrieval server 60 (St4). Similarly, the monitoring camera C2 sends the data of the captured video image to the face retrieval server 60 (St5). The face retrieval server 60 may acquire the data of the captured video image of each of the monitoring cameras C1 and C2 directly from, for example, the video image recorder 70 instead of from each of the monitoring cameras C1 and C2. The face retrieval server 60 analyzes data of the captured video image sent from each of the monitoring cameras C1 and C2, and extracts information on the face of the person reflected in the captured video image as an analysis result (St6). The information related to the face of a person includes, for example, data of a face image obtained by cutting out a face reflected in a captured image forming a captured video image. The face retrieval server 60 stores the analysis result extracted in step St6 in the storage 66 as face feature information (St7).

The monitoring camera C1 sends the data of the captured video image to the person retrieval server 50 (St8). Similarly, the monitoring camera C2 sends the data of the captured video image to the person retrieval server 50 (St9). The person retrieval server 50 may acquire the data of the captured video images of the monitoring cameras C1 and C2, for example, directly from the video image recorder 70, instead of from each of the monitoring cameras C1 and C2. The person retrieval server 50 analyzes the data of the captured video image sent from each of the monitoring cameras C1 and C2, and extracts information on a person reflected in the captured video image as an analysis result (St10). The information on the person includes, for example, data of a whole body image obtained by cutting out the whole body of a person illustrated in a captured image forming a captured video image. The person retrieval server 50 stores the analysis result extracted in step St10 in the storage 56 as personal feature information (St11). Processing of steps St1 to St11 is repeatedly executed while the power of all of the monitoring cameras C1 and C2, the video image recorder 70, the person retrieval server 50, and the face retrieval server 60 is on.

When the client terminal 90 (for example, a person monitoring application) receives an input of retrieval feature for retrieving a suspect by an operation of a user who has received information provided by a report from a witness or the like (St12), the client terminal 90 generates a retrieval request for a suspect who satisfies the retrieval condition and sends the retrieval request to the person retrieval server 50 (St13). When retrieving (for example, meta retrieval) a person who satisfies the retrieval feature (retrieval condition) included in the retrieval request according to the retrieval request from the client terminal 90, the person retrieval server 50 repeatedly retrieves until a face image (for example, a face image of a person whose face is directed to the front direction) suitable for the face image collation processing (see step St23) described later can be extracted (St14). The person retrieval server 50 transmits the data of the retrieval result in step St14 to the client terminal 90 (St15).

The client terminal 90 (for example, a person monitoring application) uses data of the retrieval result sent from the person retrieval server 50 in step St15 to generate and display a person monitoring screen WD1 (for, example, see FIG. 8) indicating a monitoring state of a person who satisfies the retrieval feature (St16). It is assumed that the user has specified the image (specifically, a face image FC1 of the suspect and a whole body image PS1 of the suspect) of the suspect to be tracked by the user's operation on the person monitoring screen WD1 displayed in step St16.

The client terminal 90 generates a registration request for registering the specified whole body image PS1 of the suspect for the whole-body image collation processing by the user's operation (St16), and transmits the whole body image PS1 of the suspect to the person retrieval server 50 by including the whole body image PS1 in the registration request (St17). Similarly, the client terminal 90 generates a registration request for registering the specified face image FC1 of the suspect for face image collation processing by the user's operation (St16), and transmits the face image FC1 to the face retrieval server 60 by including the face image FC1 in the registration request (St18). According to the registration request sent in step St17, the person retrieval server 50 registers the whole body image PS1 of the suspect included in the registration request for the whole body image collation processing (St19). Similarly, according to the registration request sent in step St18, the face retrieval server 60 registers the face image FC1 of the suspect included in the registration request for the face image collation processing (St20).

The monitoring camera C1 sends the data of the captured video image to the face retrieval server 60 (St21). Similarly, the monitoring camera C2 sends the data of the captured video image to the face retrieval server 60 (St22). The face retrieval server 60 may acquire the data of the captured video image of each of the monitoring cameras C1 and C2 directly from, for example, the video image recorder 70 instead of from each of the monitoring cameras C1 and C2. When the face retrieval server 60 specifies a face image (that is, collates a face image with the registered face image of the suspect) that matches (for example, the same as or similar to) the face image of the suspect registered in step St20, the face retrieval server 60 associates the specified face image with an alarm notification indicating that the suspect is found and sends the alarm notification to the client terminal 90 (St23). The client terminal 90 executes a predetermined alarm notification according to the alarm notification sent from the face retrieval server 60 in step St23 (St24). The predetermined alarm notification may be, for example, output of a predetermined alarm sound, display of a predetermined warning message on a pop-up screen, or both of the alarm sound and the display of the warning message, and is the same hereinafter.

Similarly, the monitoring camera C1 sends the data of the captured video image to the person retrieval server 50 (St25). Similarly, the monitoring camera C2 sends the data of the captured video image to the person retrieval server 50 (St26). The person retrieval server 50 may acquire the data of the captured video images of the monitoring cameras C1 and C2, for example, directly from the video image recorder 70, instead of from each of the monitoring cameras C1 and C2. When the person retrieval server 50 specifies a whole body image (that is, collates a whole body image with the registered whole body image of the suspect) that matches (for example, the same or similar) the whole body image of the suspect registered in step St19, the person retrieval server 50 associates the specified whole body image with an alarm notification indicating that the suspect is found and sends the alarm notification to the client terminal 90 (St27). The client terminal 90 executes a predetermined alarm notification (see above description) according to the alarm notification sent from the person retrieval server 50 in step St27 (St28).

The client terminal 90 may execute the predetermined alarm notification only when receiving the alarm notification in each of steps St23 and St27. With this configuration, for example, even when accuracy of the collation processing of the face retrieval server 60 or the person retrieval server 50 is low, the client terminal 90 can execute an accurate alarm notification, and the monitoring accuracy can be improved. A series of processing from step St21 to step St28 described above is collectively referred to as "A processing A" for convenience, and the A processing is repeatedly executed (A processing loop). With this configuration, the person monitoring system 1 can continuously track the suspect who is running away, and thus can support early arrest.

As described above, the person monitoring system 1 according to Embodiment 1 includes the person retrieval server 50 and the face retrieval server 60 communicably connected to each of n (n is an integer of 2 or more) monitoring cameras 10, 11, . . . and the client terminal 90 communicably connected to each of the person retrieval server 50 and the face retrieval server 60. When receiving the captured video images sent from each of the n monitoring cameras, the person retrieval server 50 analyzes feature information including the whole body of the person reflected in each of the captured video images, and holds a whole body image obtained by cutting out the whole body of the person as an analysis result. When receiving the captured video images sent from each of the n monitoring cameras, the face retrieval server 60 analyzes feature information including the face of the person reflected in each of the captured images, and holds a face image obtained by cutting out the face of the person as an analysis result. In response to designation of the whole body image and face image of a person of interest (for example, the suspect), the client terminal 90 send a request for execution of first collation processing targeted for the whole body image of the person of interest to the person retrieval server 50 and send a request for execution of second collation processing targeted for the face image of the person of interest to the face retrieval server 60. When a person matching the whole body image of the person of interest is specified by the request for execution of the first collation processing, the person retrieval server 50 sends an alarm notification to the client terminal 90 that the person of interest is found. Similarly, when a person matching the face image of the person of interest is specified by the second collation processing, the face retrieval server 60 sends an alarm notification to the client terminal 90 that the person of interest is found.

With this configuration, the person monitoring system 1 can extract the whole body image and the face image representing the appearance features of the suspect of an incident or the like with high accuracy, and thus can efficiently track the suspect from the viewpoints of both the whole body and the face using the captured video images of the plurality of monitoring cameras. Accordingly, the person monitoring system 1 can effectively support early grasp of the escape route of the suspect reflected in the captured video images of the plurality of monitoring cameras, and thus the convenience of the police investigation can be improved.

Each of the person retrieval server 50 and the face retrieval server 60 holds information indicating the moving direction of the person as an analysis result, and sends an alarm notification including the moving direction when passing the monitoring camera in which the person of interest is found. The client terminal 90 displays the moving direction when passing the monitoring camera in which the person of interest is found on the display 94 in association with the whole body image of the person of interest, based on the alarm notification. With this configuration, the user can highly accurately estimate the escape direction of the suspect from the moving direction of the suspect when passing the monitoring camera at each installation point, and thus early detection of a person of interest such as the suspect can be effectively supported.

The client terminal 90 displays map data MP1, which indicates the installation points of at least one monitoring camera in which the person of interest is found, on the display 94. With this configuration, the client terminal 90 can display the escape direction of the person (for example, the suspect) of the thumbnail image designated by the user's operation on the map data MP1, and thus can effectively support the early detection of the person of interest such as the suspect.

When the person matching the whole body image of the person of interest is specified by the person retrieval server 50 and the person matching the face image of the person of interest is specified by the face retrieval server 60, the client terminal 90 performs an alarm notification that the person of interest is found. With this configuration, for example, even when accuracy of the collation processing of the face retrieval server 60 or the person retrieval server 50 is low, the client terminal 90 can execute an accurate alarm notification, and the monitoring accuracy can be improved.

The client terminal 90 sends a retrieval request for the person of interest to the person retrieval server 50 in response to designation of the retrieval feature including first appearance feature composed of a target period (that is, retrieval target period), age, gender, height, and a body type and second appearance feature composed of presence or absence possessions, presence or absence of wearing goods, clothing, and hairstyle. The person retrieval server 50 sends a whole body image of a person, who satisfies the retrieval feature included in the retrieval request sent from the client terminal 90 and is substantially directed to the front direction to the extent that a face image of the person can be extracted, to the client terminal 90 as a retrieval result. The client terminal 90 designates the whole body image and the face image of the person corresponding to the retrieval result as the whole body image and the face image of the person of interest. With this configuration, accuracy of the collation processing in the face retrieval server 60 and accuracy of the collation processing in the person retrieval server 50 are both improved, and thus monitoring accuracy is consequently improved.

Embodiment 2

In Embodiment 2, an example of a person monitoring system that efficiently supports tracking of a suspect even if a face of a suspect is not imaged (for example, the back of the suspect is imaged and the face of the suspect is not imaged) in the monitoring camera when performing a further tracking investigation of a suspect after a matching face image is obtained in the face image collation processing in Embodiment 1 will be described. The configuration of the person monitoring system according to Embodiment 2 is the same as the configuration of the person monitoring system 1 according to Embodiment 1, and the same components are denoted by the same reference numerals and description thereof will be simplified or omitted, and different contents will be described.

Figure 12:
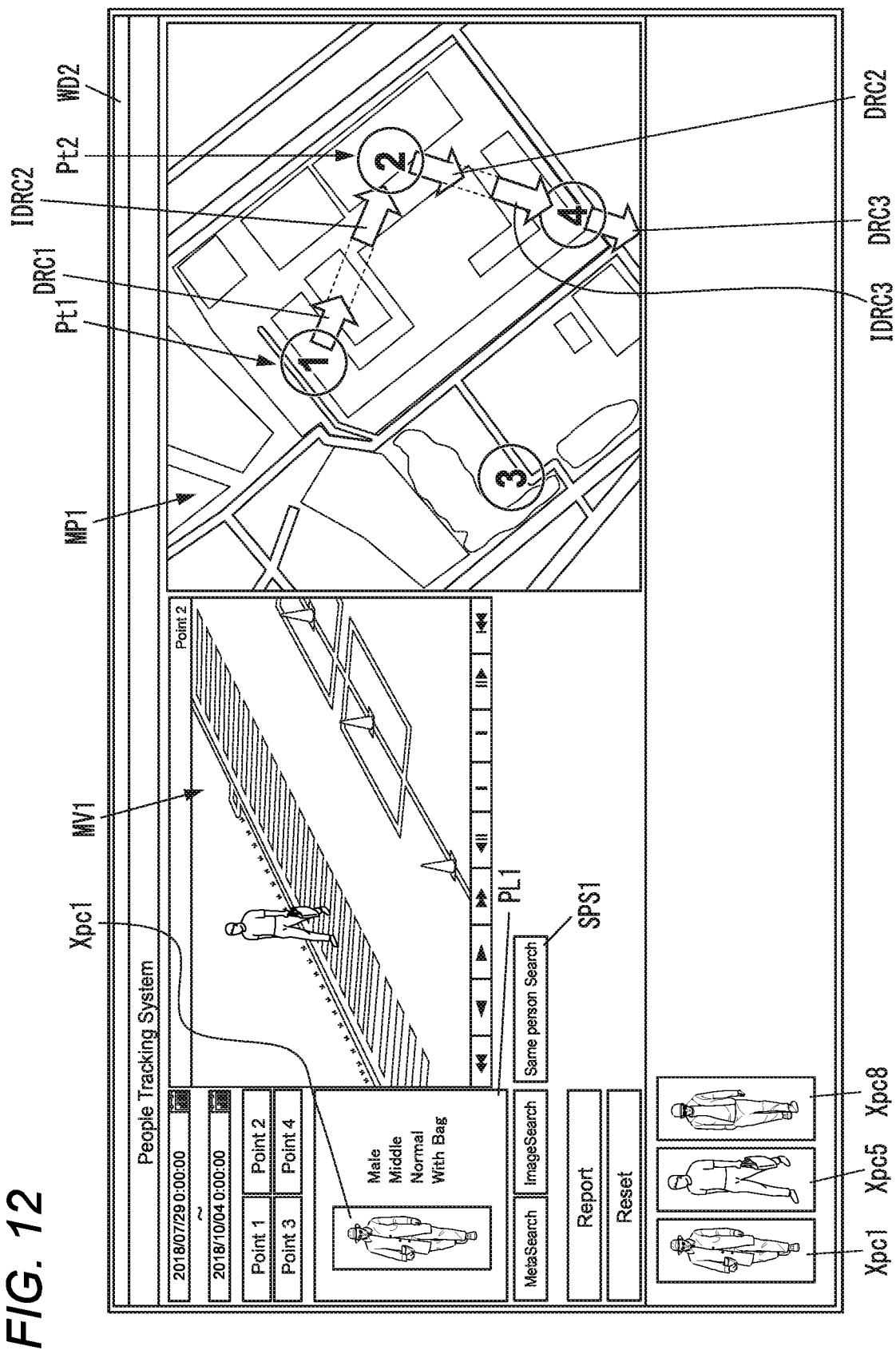
FIG. 12 is a diagram illustrating an example of an outline of an operation at the time of the same person retrieval for retrieving the same person as the person corresponding to a thumbnail image Xpc5.

FIG. 12 is a diagram illustrating an example of an outline of the operation at the time of the same person retrieval for retrieving the same person as the person corresponding to the thumbnail image Xpc5. The person monitoring application may display the thumbnail images Xpc1, Xpc5, and Xpc8 corresponding to three persons side by side on the person monitoring screen WD2, as a retrieval result of the image retrieval described above for the same as or similar to the person of the thumbnail image Xpc1 (see FIG. 12). In a person monitoring screen WD2 (see FIG. 12), a same person retrieval button SPS1 is further provided as compared to the person monitoring screen WD1 (see FIG. 9).

When it is detected that the thumbnail image Xpc1 is designated in the retrieval target person image display frame PL1 and the same person retrieval button SPS1 is pressed by the user's operation, the person monitoring application sends a request for execution of the collation processing (re-retrieval or tracking investigation of a suspect's face image described later), which includes identification information and capturing date and time of the monitoring camera that has captured the matched face image in the face image collation processing and the matched face image and the moving direction of the person when passing the installation point of the monitoring camera, to the face retrieval server 60. The person monitoring application sends a request for execution of the collation processing (re-retrieval or tracking investigation of a suspect's whole body image described later), which includes identification information and capturing date and time of the monitoring camera that has captured the matched face image in the face image collation processing and the whole body image of the person corresponding to the matched face image and the moving direction of the person when passing the installation point of the monitoring camera, to the person retrieval server 50.

The face retrieval server 60 executes the collation processing by changing a collation processing threshold value of the face image according to the moving direction of the person of the thumbnail image Xpc1 included in the execution request, in accordance with the request for execution of the collation processing from the client terminal 90. For example, when the person of the thumbnail image Xpc1 moves the installation point of the first monitoring camera indicated by the icon Pt1 in the direction DRC1 (see FIG. 12), the face retrieval server 60 lowers the collation processing threshold value of the face image of the person who approaches the installation point of the second monitoring camera indicated by the icon Pt2 from the direction IDRC2. On the other hand, the face retrieval server 60 uses the current collation processing threshold value as it is without changing the collation processing threshold value of the face image of the person who approaches the installation point of the second monitoring camera indicated by the icon Pt2 from a direction other than the direction IDRC2.

For example, when the person of the thumbnail image Xpc1 moves the installation point of the second monitoring camera indicated by the icon Pt2 in the direction DRC2 (see FIG. 12), the face retrieval server 60 lowers the collation processing threshold value of the face image of the person who approaches the installation point of the fourth monitoring camera indicated by the icon Pt4 from the direction IDRC3. On the other hand, the face retrieval server 60 uses the current collation processing threshold value as it is without changing the collation processing threshold value of the face image of the person who approaches the installation point of the fourth monitoring camera indicated by the icon Pt4 from a direction other than the direction IDRC3.

Similarly, the person retrieval server 50 executes the collation processing by changing a collation processing threshold value of the whole body image according to the moving direction of the person of the thumbnail image Xpc1 included in the execution request, in accordance with the request for execution of the collation processing from the client terminal 90. For example, when the person of the thumbnail image Xpc1 moves the installation point of the first monitoring camera indicated by the icon Pt1 in the direction DRC1 (see FIG. 12), the person retrieval server 50 lowers the collation processing threshold value of the whole body image of the person who approaches the installation point of the second monitoring camera indicated by the icon Pt2 from the direction IDRC2. On the other hand, the person retrieval server 50 uses the current collation processing threshold value as it is without changing the collation processing threshold value of the whole body image of the person who approaches the installation point of the second monitoring camera indicated by the icon Pt2 from a direction other than the direction IDRC2.

For example, when the person of the thumbnail image Xpc1 moves the installation point of the second monitoring camera indicated by the icon Pt2 in the direction DRC2 (see FIG. 12), the person retrieval server 50 lowers the collation processing threshold value of the whole body image of the person who approaches the installation point of the fourth monitoring camera indicated by the icon Pt4 from the direction IDRC3. On the other hand, the person retrieval server 50 uses the current collation processing threshold value as it is without changing the collation processing threshold value of the whole body image of the person who approaches the installation point of the fourth monitoring camera indicated by the icon Pt4 from a direction other than the direction IDRC3.

Figure 13:
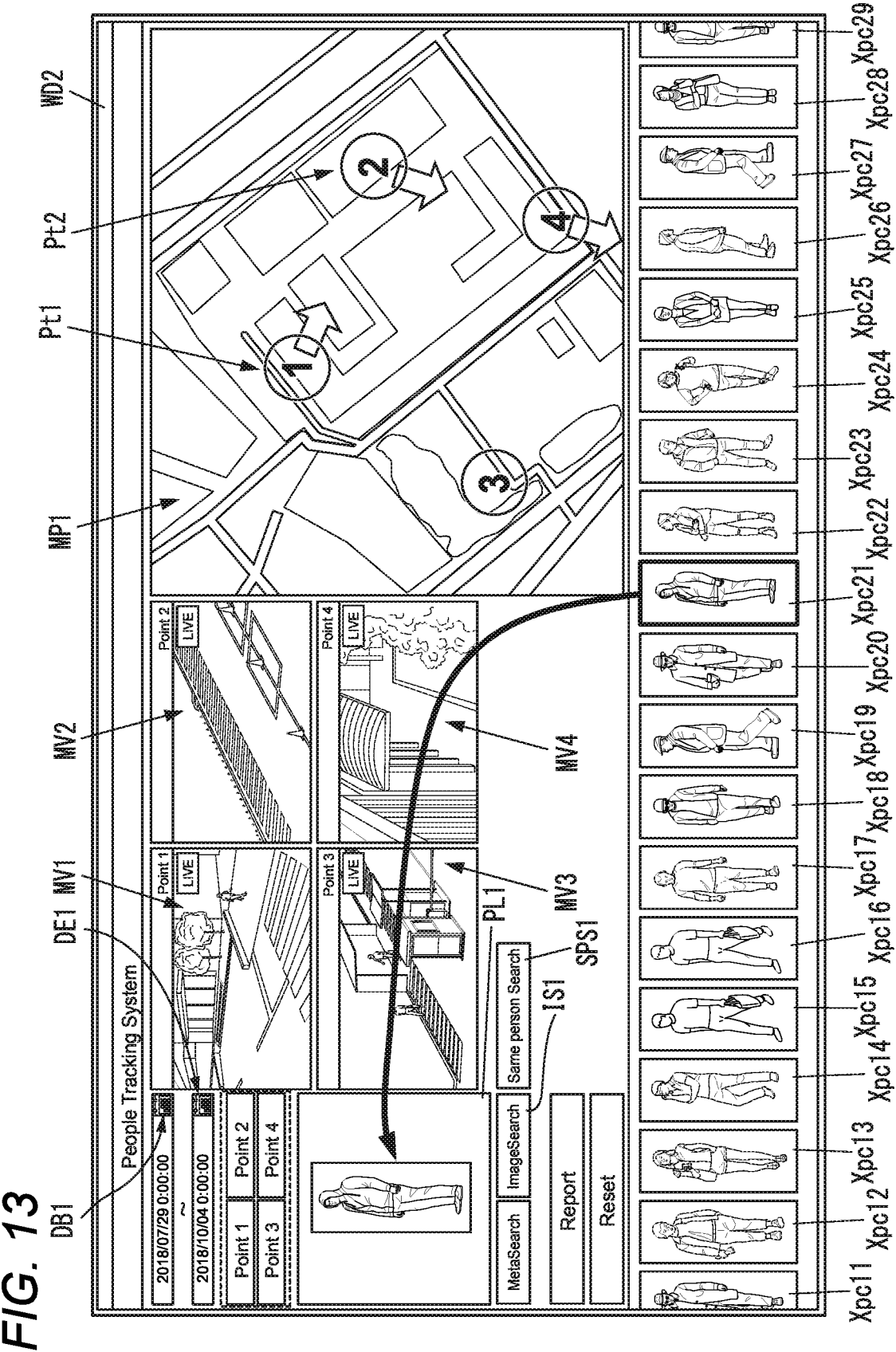
FIG. 13 is a diagram illustrating an example of a person monitoring screen for instructing image retrieval for a person similar to a person corresponding to a thumbnail image Xpc11.
Figure 14:
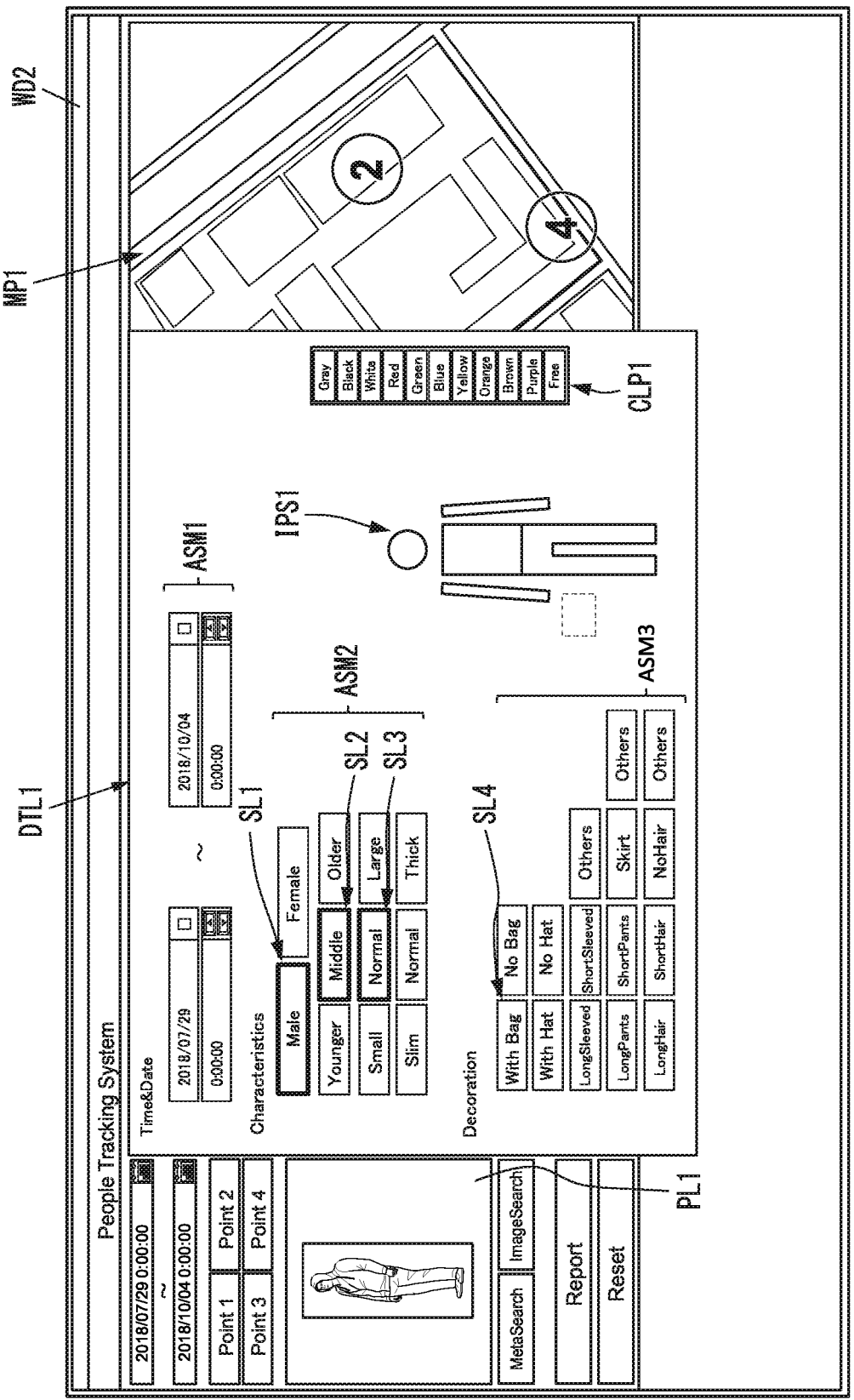
FIG. 14 is a diagram illustrating an example of a detailed setting screen of the retrieval feature of the suspect.

FIG. 13 is a diagram illustrating an example of the person monitoring screen WD2 for instructing the image retrieval for a person similar to the person corresponding to the thumbnail image Xpc11. FIG. 14 is a diagram illustrating an example of the detailed setting screen DTL1 of the retrieval feature of the suspect. The person monitoring application may display the person monitoring screen WD2 (see FIG. 13) using the data of the retrieval result sent from the person retrieval server 50 by, for example, the meta retrieval described with reference to Embodiment 1. On the person monitoring screen WD2 (see FIG. 13), thumbnail images Xpc11, Xpc12, Xpc13, Xpc14, Xpc15, Xpc16, Xpc17, Xpc18, Xpc19, Xpc20, Xpc21, Xpc22, Xpc23, Xpc24, Xpc25, Xpc26, Xpc27, Xpc28, and Xpc29 of the person matching meta information designated by the user's operation are displayed side by side. When all the thumbnail images cannot be displayed, the person monitoring application allows the remaining thumbnail images to be scrolled and displayed by a user operation using the scroll bar SCR1.

Here, it is assumed that the user notices that the person of the thumbnail image Xpc21 may be a suspect among the plurality of thumbnail images Xpc11 to Xpc29. The person monitoring application displays the same thumbnail image as the thumbnail image Xpc21 selected by the user's operation in the retrieval target person image display frame PL1, and further displays the detailed setting screen DTL1 by a predetermined user's operation. In FIG. 14, it is assumed that the option SL4 of "With Bag" is unchecked by the user's operation.

For example, the suspect had a bag with cash stolen at a bank or a store (see FIG. 7) at the beginning of the escape, but may have thrown away the bag on the way or passed away to another collaborator to escape. Therefore, the person monitoring application unchecks "With Bag" on the detailed setting screen DTL1 in FIG. 7 based on the user's operation (see FIG. 14), and can cause the person retrieval server 50 to retrieve for a whole body image of the suspect.

Accordingly, when the image retrieval button IS1 is pressed after the option SL4 of "With Bag" is unchecked in FIG. 14, the person monitoring application sends a retrieval request for a person (however, the condition for owning a black bag is excluded from the retrieval target) who is the same as or similar to the person in the thumbnail image Xpc21 to the person retrieval server 50. Similarly, the person retrieval server 50 retrieves (image retrieval) a person who is the same as or similar to the person in the thumbnail image Xpc21 according to the retrieval request sent from the client terminal 90, and sends the retrieval result to the client terminal 90.

Figure 15:
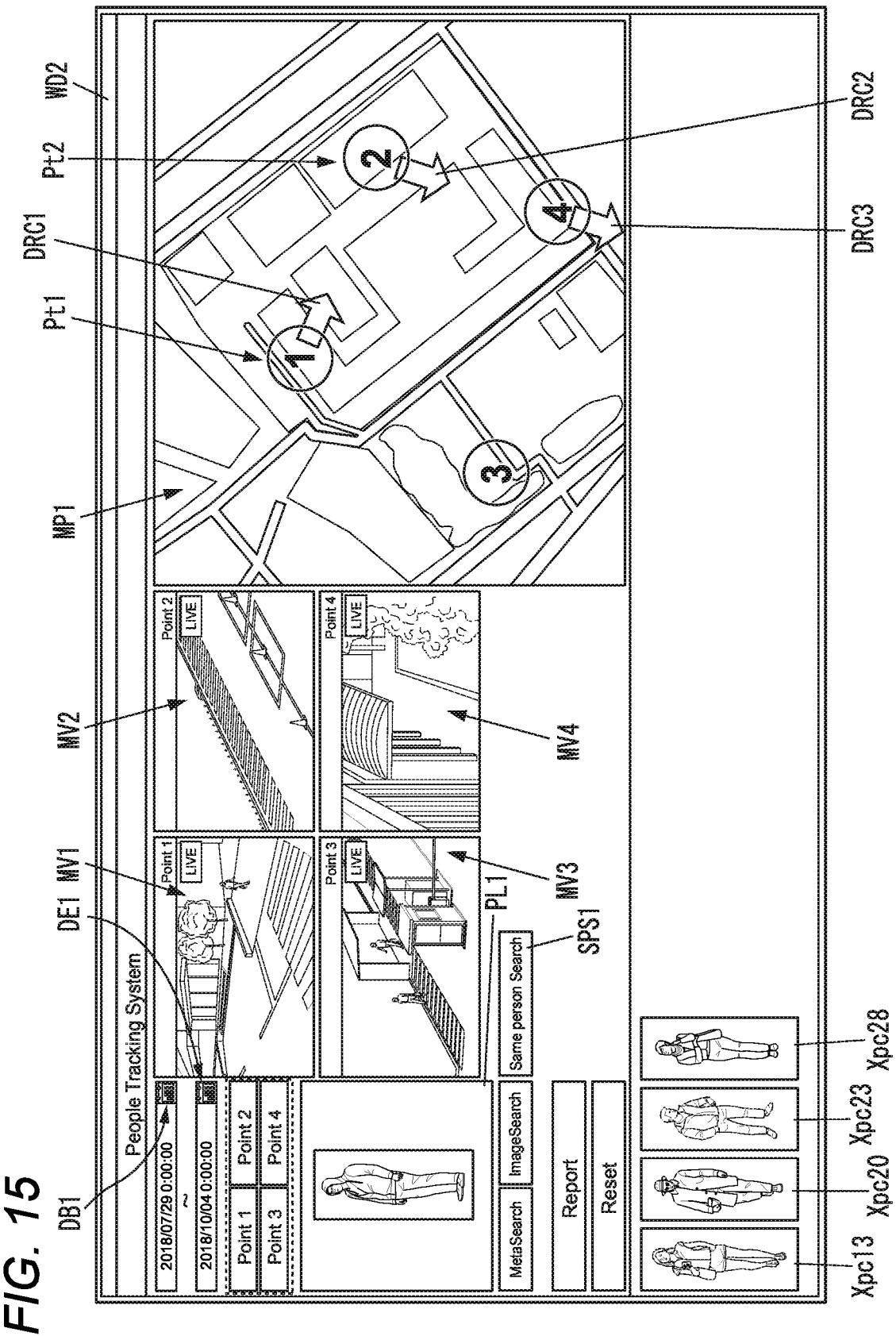
FIG. 15 is a diagram illustrating an example of a person monitoring screen for displaying person retrieval results, in time series, by using both meta retrieval and image retrieval using the retrieval feature set on the detailed setting screen of FIG. 14 as the retrieval condition.

FIG. 15 is a diagram illustrating an example of a person monitoring screen WD2 that displays person retrieval results, in time series, by using both meta retrieval and image retrieval using the retrieval feature set on the detailed setting screen DTL1 of FIG. 14 as the retrieval condition. The person monitoring application displays the thumbnail images Xpc13, Xpc20, Xpc23, and Xpc28 corresponding to the four persons, who are the same as or similar to the person in the thumbnail image Xpc21, side by side on the person monitoring screen WD2 as retrieval results of the image retrieval described above.

Figure 16:
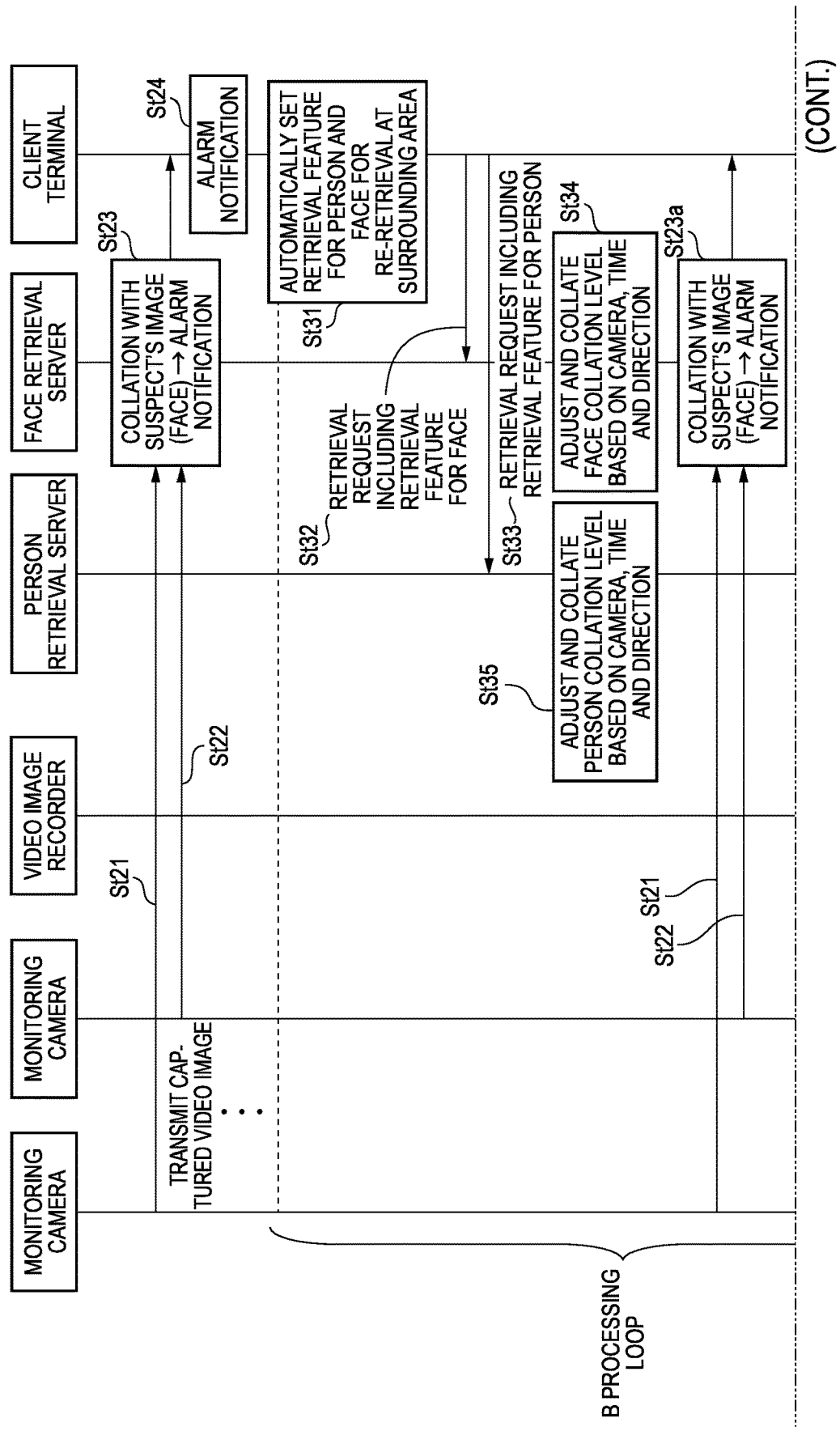
FIG. 16 is a sequence diagram illustrating an example of an operation procedure of a person monitoring system according to Embodiment 2.

Next, an operation procedure of the person monitoring system 1 according to Embodiment 2 will be described with reference to FIG. 16. FIG. 16 is a sequence diagram illustrating an example of an operation procedure of the person monitoring system 1 according to Embodiment 2. Also, in FIG. 16, two monitoring cameras (for example, monitoring camera C1 installed at the point of icon Pt1 and monitoring camera C2 installed at the point of icon Pt2 in FIG. 6) are exemplified, but three or more monitoring cameras may be illustrated. In the description of FIG. 16, the same processing as the processing described in FIG. 11 will be assigned the same step numbers, the description thereof will be simplified or omitted, and different contents will be described. Furthermore, in the description of FIG. 16, processing of steps St1 to St20 illustrated in FIG. 11 may be performed before processing of step St21 is performed.

In FIG. 16, after the time (step St23) when it is determined that the face image of the suspect has been matched in the face image collation processing, a re-retrieval (in other words, further tracking investigation of a suspect) of the face and whole body of the suspect is performed in the surrounding area of the installation point of the monitoring camera that images the captured video image in which the face image of the suspect is reflected. Specifically, after step St24, the client terminal 90 automatically sets retrieval feature for a person (whole body) and retrieval feature for a face for performing a re-retrieval (see above description) centering on the surrounding area, respectively (St31). Specifically, the retrieval feature for the person includes identification information of a monitoring camera (hereinafter also referred to as "hit monitoring camera") installed at a point where the face image of the suspect matches (hits), the date and time of the face image of the hit suspect, the whole body image PS1 of the suspect (see step St17) used for collation processing, and the moving direction of the suspect when passing the installation point of the hit monitoring camera. Similarly, the retrieval features for the face include identification information of a monitoring camera installed at a point where the face image of the suspect matches (hits), the date and time of the face image of the hit suspect, the face image FC1 of the (see step St18) used for collation processing, and the moving direction of the suspect when passing the installation point of the hit monitoring camera.

The client terminal 90 (for example, a person monitoring application) generates a retrieval request including the retrieval feature for face generated in step St31 and sends the retrieval request to the face retrieval server 60 (St32). Similarly, the client terminal 90 (for example, a person monitoring application) generates a retrieval request including the retrieval feature for person generated in step St31 and sends the retrieval request to the person retrieval server 50 (St33). In response to the retrieval request sent in step St32, the face retrieval server 60 changes the collation processing threshold value of the face image according to the moving direction of the suspect when passing the installation point of the hit monitoring camera, based on the retrieval feature included in the retrieval request (see St34 in FIG. 12). Similarly, in response to the retrieval request sent in step St32, the person retrieval server 50 changes the collation processing threshold value of the whole body image according to the moving direction of the suspect when passing the installation point of the hit monitoring camera, based on the retrieval feature included in the retrieval request (see St35 in FIG. 12).

The monitoring camera C1 sends the data of the captured video image to the face retrieval server 60 (St21). Similarly, the monitoring camera C2 sends the data of the captured video image to the face retrieval server 60 (St22). The face retrieval server 60 may acquire the data of the captured video image of each of the monitoring cameras C1 and C2 directly from, for example, the video image recorder 70 instead of from each of the monitoring cameras C1 and C2. After change processing of the collation processing threshold value according to the moving direction of the suspect in step St34, when the face retrieval server 60 specifies a face image (that is, collates a face image with the registered face image of the suspect) that matches (for example, the same as or similar to) the face image of the suspect registered in step St20, the face retrieval server 60 associates the specified face image with an alarm notification indicating that the suspect is found and sends the alarm notification to the client terminal 90 (St23*a*). The client terminal 90 executes a predetermined alarm notification according to the alarm notification sent from the face retrieval server 60 in step St23*a* (St24).

Similarly, the monitoring camera C1 sends the data of the captured video image to the person retrieval server 50 (St25). Similarly, the monitoring camera C2 sends the data of the captured video image to the person retrieval server 50 (St26). The person retrieval server 50 may acquire the data of the captured video images of the monitoring cameras C1 and C2, for example, directly from the video image recorder 70, instead of from each of the monitoring cameras C1 and C2. After change processing of the collation processing threshold value according to the moving direction of the suspect in step St35, when the person retrieval server 50 specifies a whole body image (that is, collates a whole body image with the registered whole body image of the suspect) that matches (for example, the same as or similar to) the whole body image of the suspect registered in step St19, the person retrieval server 50 associates the specified whole body image with an alarm notification indicating that the suspect is found and sends the alarm notification to the client terminal 90 (St27*a*). The client terminal 90 executes a predetermined alarm notification (see above description) according to the alarm notification sent from the person retrieval server 50 in step St27*a* (St28).

A series of processing including processing from step St31 to step St35 and processing from step St21 to step St28 described above is collectively referred to as "B processing" for convenience, and this B processing is repeatedly executed (B processing loop). With this configuration, the person monitoring system 1 can adjust to the escape direction even if a face of a suspect is not imaged (for example, the back of the suspect is imaged and the face of the suspect is not imaged) in the monitoring camera during the escape of the suspect, since the person monitoring system 1 can adaptively change the collation processing threshold value of the collation processing according to the escape direction, the person monitoring system 1 can continuously track the suspect who is escaping, and can support early arrest.

The suspect during the escape possessed a bag or the like containing a large amount of cash at the beginning of the escape, but there is a possibility that the bag was thrown away during the escape or handed over the bag to another cooperator to escape. In view of such a possibility, a series of processing (C processing) in step St36 and subsequent steps will be described.

In FIG. 16, the client terminal 90 generates (sets) a retrieval request including the retrieval feature in which the option SL4 of "With Bag" is unchecked (that is, the option SL4 is excluded) on the detailed setting screen DTL1 (see FIG. 14), for example, after step St28, based on the user's operation in consideration of the possibility that the suspect no longer has a bag during the escape (St36). The client terminal 90 sends the generated retrieval request, that is, the retrieval request including the retrieval feature generated in step St36, to the face retrieval server 60 and the person retrieval server for re-retrieval or tracking investigation (see above description) for tracking the suspect 50 (St37, St38).

In response to the retrieval request sent in step St37, the face retrieval server 60 changes the collation processing threshold value of the face image according to the moving direction of the suspect when passing the installation point of the hit monitoring camera, based on the retrieval feature included in the retrieval request (St34a in FIG. 12). Similarly, in response to the retrieval request sent in step St38, the person retrieval server 50 changes the collation processing threshold value of the whole body image according to the moving direction of the suspect when passing the installation point of the hit monitoring camera, based on the retrieval feature included in the retrieval request (St35a in FIG. 12).

The monitoring camera C1 sends the data of the captured video image to the face retrieval server 60 (St21). Similarly, the monitoring camera C2 sends the data of the captured video image to the face retrieval server 60 (St22). The face retrieval server 60 may acquire the data of the captured video image of each of the monitoring cameras C1 and C2 directly from, for example, the video image recorder 70 instead of from each of the monitoring cameras C1 and C2. After change processing of the collation processing threshold value according to the moving direction of the suspect in step St34a, when the face retrieval server 60 specifies a face image (that is, collates a face image with the registered face image of the suspect) that satisfies the retrieval feature set in step St36 and matches (for example, the same as or similar to) the face image of the suspect registered in step St20, the face retrieval server 60 associates the specified face image with an alarm notification indicating that the suspect is found and sends the alarm notification to the client terminal 90 (St23b). The client terminal 90 executes a predetermined alarm notification according to the alarm notification sent from the face retrieval server 60 in step St23b (St24).

Similarly, the monitoring camera C1 sends the data of the captured video image to the person retrieval server 50 (St25). Similarly, the monitoring camera C2 sends the data of the captured video image to the person retrieval server 50 (St26). The person retrieval server 50 may acquire the data of the captured video images of the monitoring cameras C1 and C2, for example, directly from the video image recorder 70, instead of from each of the monitoring cameras C1 and C2. After change processing of the collation processing threshold value according to the moving direction of the suspect in step St35a, when the person retrieval server 50 specifies a whole body image (that is, collates a whole body image with the registered whole body image of the suspect) that satisfies the retrieval feature set in step St36 and matches (for example, the same as or similar to) the whole body image of the suspect registered in step St19, the person retrieval server 50 associates the specified whole body image with an alarm notification indicating that the suspect is found and sends the alarm notification to the client terminal 90 (St27b). The client terminal 90 executes a predetermined alarm notification (see above description) according to the alarm notification sent from the person retrieval server 50 in step St27a (St28).

A series of processing including processing from step St36 to step St38, processing St34a and St35a, and processing from step St21 to step St28 described above is collectively referred to as "C processing" for convenience, and this C processing is repeatedly executed (C processing loop). With this configuration, the person monitoring system 1 can adjust to the escape direction even if a face of a suspect is not imaged (for example, the back of the suspect is imaged and the face of the suspect is not imaged) in the monitoring camera during the escape of the suspect, since the person monitoring system 1 can adaptively change the collation processing threshold value of the collation processing according to the escape direction, the person monitoring system 1 can continuously track the suspect who is escaping, and can support early arrest.

As described above, in the person monitoring system 1 according to Embodiment 2, the person retrieval server 50 sets the threshold value of the first collation processing (for example, the collation processing threshold value) using the captured video images of one or more monitoring cameras installed in the moving direction to be lower than a predetermined value, based on the moving direction when passing the monitoring camera in which the person of interest (for example, the suspect) is found. With this configuration, even when the whole body of the suspect is imaged to the extent that it is difficult to identify the person (for example, the front of the whole body cannot be imaged), the person retrieval server 50 can accurately perform the collation, and can effectively support tracking of the suspect utilizing the characteristics that the moving direction of the suspect who is hit when passing the installation point of the monitoring camera is substantially equal to the direction approaching the monitoring camera existing in the moving direction in the collation processing. The face retrieval server 60 sets the threshold value of the second collation processing (for example, the collation processing threshold value) using the captured video images of one or more monitoring cameras installed in the moving direction to be lower than a predetermined value, based on the moving direction when passing the monitoring camera in which the person of interest (for example, the suspect) is found. With this configuration, even when the face of the suspect is imaged to the extent that it is difficult to identify the person (for example, the front of the face cannot be imaged), the face retrieval server 60 can accurately perform the collation, and can effectively support tracking of the suspect utilizing the characteristics that the moving direction of the suspect who is hit when passing the installation point of the monitoring camera is substantially equal to the direction approaching the monitoring camera existing in the moving direction in the collation processing.

The person retrieval server 50 uses the threshold value of the first collation processing (for example, the collation processing threshold value) using the captured video images of one or more monitoring cameras installed in directions other than the moving direction without changing the threshold value of the first collation processing from the predetermined value. With this configuration, the person retrieval server 50 can effectively support tracking of the suspect in consideration of the possibility that the suspect who is hit in the collation processing approaches in a direction different from the moving direction of the suspect who is hit when passing the installation point of the monitoring camera. The face retrieval server 60 uses the threshold value of the second collation processing using the captured video images of one or more monitoring cameras installed in directions other than the moving direction without changing the threshold value of the second collation processing from the predetermined value. With this configuration, the face retrieval server 60 can effectively support tracking of the suspect in consideration of the possibility that the suspect who is hit in the collation processing approaches in a direction different from the moving direction of the suspect who is hit when passing the installation point of the monitoring camera.

The client terminal 90 sends a request for execution of the first collation processing and the second collation processing using the retrieval feature including the changed appearance feature to each of the person retrieval server 50 and the face retrieval server 60 in response to a change operation of appearance feature composed of presence or absence of possessions, presence or absence of wearing goods, clothing, and hairstyle of a person of interest (for example, suspect). The person retrieval server 50 sends an alarm notification to the client terminal 90 that the person of interest is found when a person matching the whole body image of the person of interest who satisfies the changed retrieval feature is specified by the first collation processing. The face retrieval server 60 sends an alarm notification to the client terminal 90 that the person of interest is found when a person matching the face image of the person of interest who satisfies the changed retrieval feature is specified by the second collation processing. With this configuration, even when there is a possibility that the suspect during the escape possessed a bag or the like containing a large amount of cash at the beginning of the escape, but has thrown away the bag during the escape or has handed over the bag to another cooperator to escape, the person monitoring system 1 can efficiently track the suspect.

Background Leading to Configuration of Embodiment 3

For example, in the case of crimes such as snatching, arson, burglary, vandalism, and the like, which is highly reciprocal and is likely to be committed continuously over time, the offenders are naturally persons present at the site of each crime. When a plurality of incidents caused by such crimes occur consecutively, it is often the case that even police investigations searches for persons present at all incident sites. However, in JP-A-2017-40983 described above, there is no consideration of extracting whole body images and face images of persons present at a plurality of incident sites as suspects of the incident or the like and using these whole body images and face images to track the suspect when the cases described above with high recidivism occur consecutively.

When an incident or the like occurs, it is important to grasp appearance feature and whereabouts of the suspect at an early stage in an initial police investigation. However, in the related art so far, when an incident or the like occurs, a police officer has sorted out the likely suspects and the direction of escape, relying on clues such as visual browsing of the video image captured the monitoring camera installed at each of a plurality of locations around the site and information from witnesses. For that reason, there is a problem that it takes time for the police officer to grasp appearance feature of the suspect and the escape direction, which lead to a delay in initial investigation is delayed and inefficiency.

In the following Embodiment 3, description will be made on a person monitoring system and a person monitoring method for, when incidents with high recidivism occur consecutively, extracting a whole body image and a face image representing appearance feature of a suspect with high accuracy, tracking the suspect, and supporting an early grasp of an escape route of the suspect reflected in a captured video image of a monitoring camera, thereby improving the convenience of police investigation.

Embodiment 3

The configuration of the person monitoring system according to Embodiment 3 is the same as that of the person monitoring system 1 according to Embodiment 1, and the same components are denoted by the same reference numerals, description thereof will be simplified or omitted, and different contents will be described.

Figure 17:
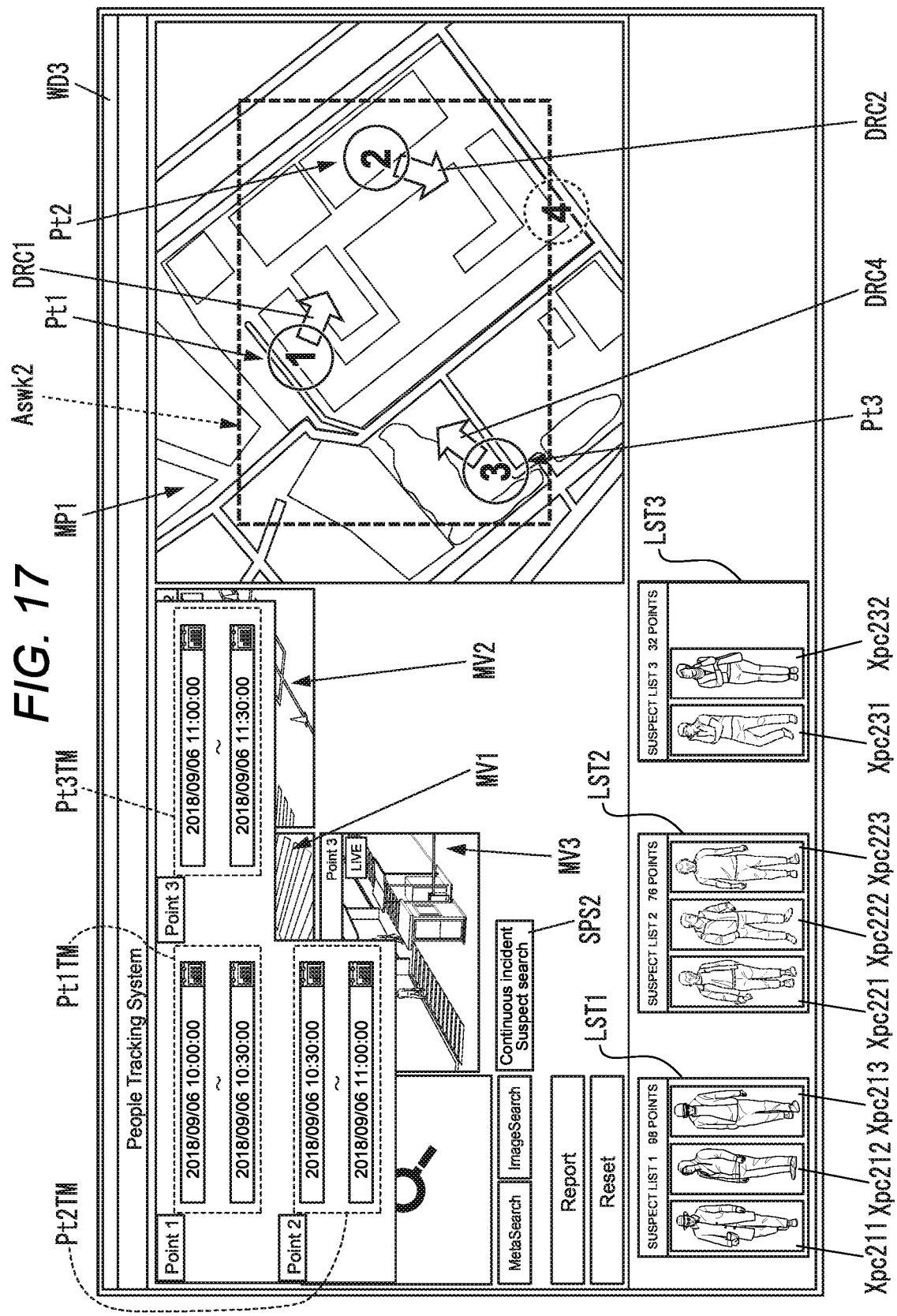
FIG. 17 is a diagram illustrating an example of a person monitoring screen illustrating an example of a suspect list reflected in each of monitoring cameras at a plurality of points.

FIG. 17 is a diagram illustrating an example of a person monitoring screen WD3 illustrating an example of a suspect list reflected in each of the monitoring cameras at a plurality of points. The person monitoring application displays a camera selection frame ASWK2 on the map data MP1 by a user's operation. The camera selection frame ASWK2 is used for selecting captured video images MV1, MV2, and MV3 (for example, live video images) of the monitoring camera displayed on the person monitoring screen WD3. In FIG. 17, three of the first to third monitoring cameras are selected in the camera selection frame ASWK2 by a user's operation. The person monitoring application may display the display mode of the icons Pt1 to Pt3 so as to be more easily identified than the icon Pt4 of the unselected monitoring camera, in order to indicate that the icons have been selected by the camera selection frame ASWK2.

The person monitoring application displays various buttons for supporting retrieval of a person of interest, such as a suspect, on the person monitoring screen WD3, when the incidents with high recidivism described above occur consecutively. For example, in conjunction with the selection by the camera selection frame ASWK2, the person monitoring application superimposes and displays the input screens Pt1TM, Pt2TM, and Pt3TM for the periods during the suspect is considered to have been present in the first surveillance camera in each of the plurality of selected monitoring cameras on the person monitoring screen WD3. In each of the input screens Pt1TM, Pt2TM, and Pt3TM, a period during which the suspect is considered to have been present in the first surveillance camera is input by a user operation in the first monitoring camera (see icon Pt1), the second monitoring camera (see icon Pt2), and the third monitoring camera (see icon Pt3) is input by a user's operation. In this example, when the number of monitoring cameras selected by a user operation is k (k is an integer of 2 or more that satisfies k≤n), k=3.

For example, it is assumed that incidents with high recidivism, such as snatching, occur consecutively in the order of "Point3" (that is, the installation point of the third monitoring camera), "Point1" (that is, the installation point of the first monitoring camera), and "Point2" (that is, the installation point of the second monitoring camera). In the example of FIG. 17, "10:00 am on Sep. 6, 2018" to "10:30 am on Sep. 6, 2018" is input to the input screen Pt3TM as a period during which the suspect is considered to have been present at "Point3". Similarly, "10:30 am on Sep. 6, 2018" to "11:00 am on Sep. 6, 2018" is input to the input screen Pt1TM as a period during which there is a suspect at "Point1". Similarly, "11:00 am on Sep. 6, 2018" to "11:30 am on Sep. 6, 2018" is input to the input screen Pt2TM as a period during which the suspect is considered to have been present at "Point2".

When it is detected that a period has been input to each of the input screens Pt1TM to Pt3TM and a consecutive incident suspect retrieval button SPS2 has been pressed by the user's operation, the person monitoring application generates retrieval requests for a whole body and a face of a person (for example, a person who is a candidate for a suspect) existing in each period and point of the input screens Pt1TM to Pt3TM, and sends the retrieval requests to the person retrieval server 50 and the face retrieval server 60. According to the retrieval request sent from the client terminal 90, the person retrieval server 50 retrieves a whole body image of a person (a person who has existed for a period and at a point of each of the input screens Pt1TM to Pt3TM) who satisfies the retrieval feature included in the retrieval request, and sends data of the retrieval result to the client terminal 90. Similarly, according to the retrieval request sent from the client terminal 90, the face retrieval server 60 retrieves a face image of a person (a person who has existed for a period and at a point of each of the input screens Pt1TM to Pt3TM) who satisfies the retrieval feature included in the retrieval request, and sends data of the retrieval result to the client terminal 90.

The person monitoring application displays the suspect lists LST1, LST2, and LST3 including images of candidate of suspects considered to have existed in each corresponding period in the order of "Point3", "Point1", and "Point2 side by side on the person monitoring screen WD3 using at least one of data of the retrieval result from the person retrieval server 50 and the face retrieval server 60. The suspect list LST1 includes a retrieval score (score) as a candidate of a suspect in the person retrieval server 50 or the face retrieval server 60, thumbnail images Xpc211, Xpc212, and Xpc213 illustrating the whole bodies of persons who are candidates for the suspect. The suspect list LST2 includes a retrieval score (score) as a candidate of a suspect in the person retrieval server 50 or the face retrieval server 60, thumbnail images Xpc221, Xpc222, and Xpc223 illustrating the whole bodies of persons who are candidates for the suspect. The suspect list LST3 includes a retrieval score (score) as a candidate of a suspect in the person retrieval server 50 or the face retrieval server 60, thumbnail images Xpc231 and Xpc232 illustrating the whole bodies of persons who are candidates for the suspect. In the example of FIG. 17, it is illustrated that the person indicated by the suspect list LST1 is most likely to be a candidate for a suspect.

In the example of FIG. 17, although a thumbnail image of a whole body image of a person who can be a candidate for a suspect is illustrated, a thumbnail image of the face of the corresponding person may be illustrated, or a thumbnail image of both the whole body and the face of the corresponding person may be illustrated. For example, when detecting that an arbitrary position within the frame of the suspect list LST1 has been designated by a user's operation, the person monitoring application may superimpose and display, on the map data MP1, the moving direction of the person (identical person) of each of the thumbnail images Xpc211 to Xpc213 when passing the installation point of the monitoring camera (see FIG. 17). For example, it is illustrated that the person of the thumbnail image Xpc211 moves (runs away) the point "Point3" in the direction DRC4, moves (runs away) the point "Point1" in the direction DRC1, and moves (runs away) the point "Point2" in the direction DRC2.

Figure 18:
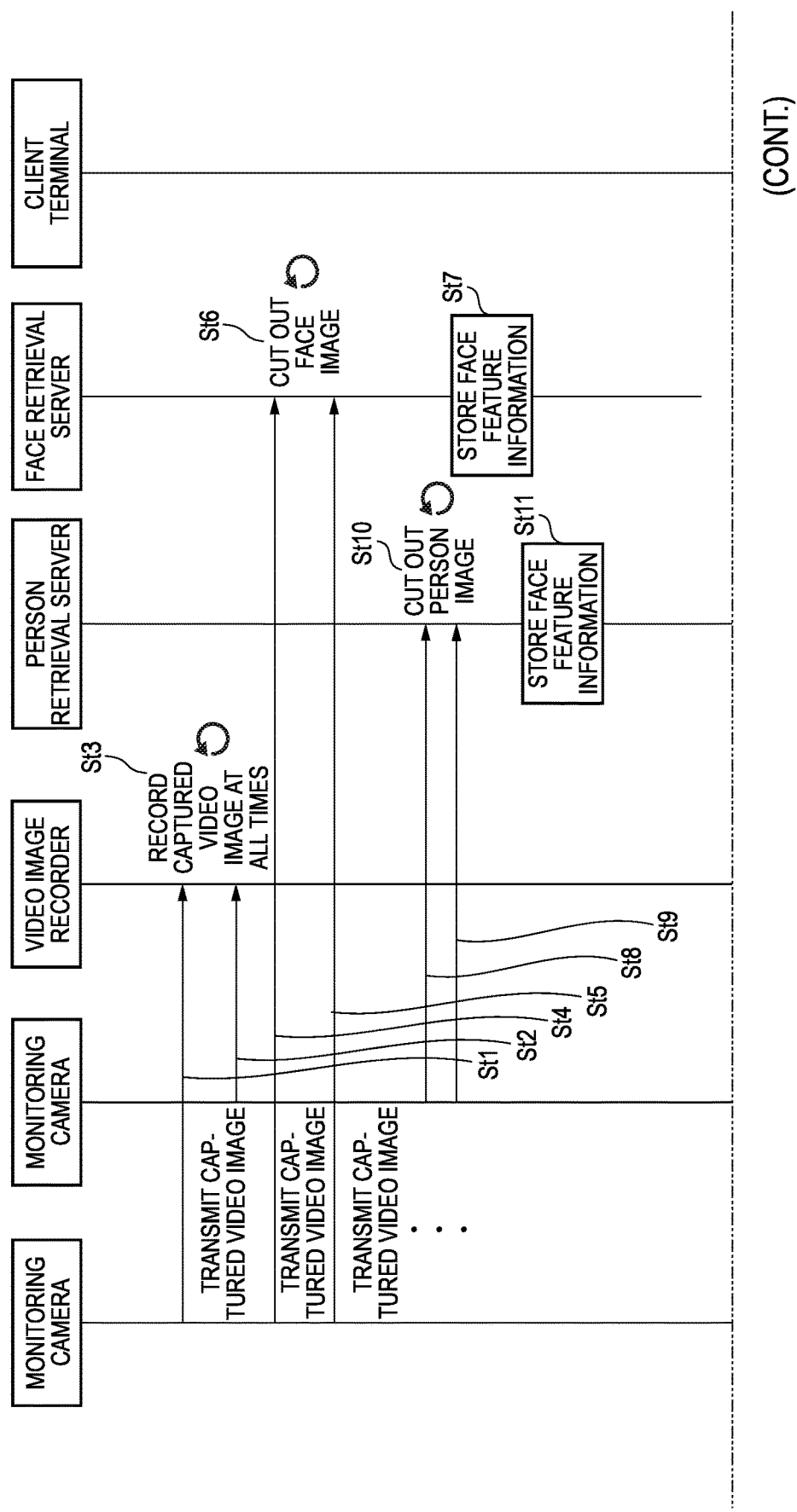
FIG. 18 is a sequence diagram illustrating an example of an operation procedure of a person monitoring system according to Embodiment 3.

Next, an operation procedure of the person monitoring system 1 according to Embodiment 3 will be described with reference to FIG. 18. FIG. 18 is a sequence diagram illustrating an example of an operation procedure of the person monitoring system 1 according to Embodiment 3. In FIG. 18, two monitoring cameras (for example, the monitoring camera C1 installed at the point of the icon Pt1 and the monitoring camera C2 installed at the point of the icon Pt2 in FIG. 6) are illustrated, but three or more monitoring cameras may be illustrated. In the description of FIG. 18, the same processing as the processing described in FIG. 11 will be assigned the same step numbers, the description thereof will be simplified or omitted, and different contents will be described. In FIG. 18, it is assumed that incidents with high recidivism, such as snatching, occur consecutively in the order of "Point3", "Point1", and "Point2".

In FIG. 18, after steps St7 and St11, the client terminal 90 (for example, a person monitoring application) detects that a period has been input to each of the input screens Pt1TM to Pt3TM illustrated in FIG. 17 and that the consecutive incident suspect retrieval button SPS2 has been pressed by a user's operation (St41). The client terminal 90 generates retrieval requests for the whole body and the face of the person (for example, a person who is a candidate for a suspect) who has existed in the periods and point of each of the input screens Pt1TM to Pt3TM, and sends the retrieval requests to the person retrieval server 50 and the face retrieval server 60, respectively (St42, St43).

According to the retrieval request sent from the client terminal 90, the person retrieval server 50 retrieves a whole body image of a person who satisfies the same person during the target period in each of the plurality of monitoring cameras corresponding to the retrieval features (persons who has existed in the period and point of each of the input screens Pt1TM to Pt3TM) included in the retrieval request (St44). Similarly, according to the retrieval request sent from the client terminal 90, the face retrieval server 60 retrieves a face image of a person who satisfies the same person during the target period in each of the plurality of monitoring cameras corresponding to the retrieval features (persons who has existed in the period and point of each of the input screens Pt1TM to Pt3TM) included in the retrieval request (St45). The face retrieval server 60 sends the data of the retrieval result obtained by the retrieval in step St45 to the client terminal 90 (St46). Similarly, the person retrieval server 50 sends the data of the retrieval result obtained by the retrieval in step St44 to the client terminal 90 (St47).

The client terminal 90 (for example, a person monitoring application) displays suspect lists LST1, LST2, and LST3, which include images of candidates of suspects considered to have existed in each corresponding period in the order of "Point3", "Point1", and "Point2", side by side on the person monitoring screen WD3 using at least one of data of the retrieval result from the person retrieval server 50 and the face retrieval server 60 (St48).

As described above, the person monitoring system 1 according to Embodiment 3 includes the person retrieval server 50 and the face retrieval server 60 that are communicably connected to each of n (n is an integer of 2 or more) monitoring cameras 10, 11, . . ., and the client terminal 90 communicably connected to each of the person retrieval server 50 and the face retrieval server 60. When receiving the captured video images sent from each of the n monitoring cameras, the person retrieval server 50 analyzes feature information including the whole body of the person reflected in each of the captured video images, and holds a whole body image obtained by cutting out the whole body of the person as an analysis result. When receiving the captured video images sent from each of the n monitoring cameras, the face retrieval server 60 analyzes feature information including the face of the person reflected in each of the captured images, and holds a face image obtained by cutting out the face of the person as an analysis result. In response to designation of k (k is an integer of 2 or more satisfying k≤n) monitoring cameras among the n monitoring cameras and respective capturing periods of the k monitoring cameras, the client terminal 90 sends a request for execution of retrieval processing of a whole body of the same person of interest reflected in the captured video images imaged by the k monitoring cameras to the person retrieval server 50 and sends a request for execution of retrieval processing of a face of the same person of interest reflected in the captured video images imaged by the k monitoring cameras to the face retrieval server 60. When a person matching the whole body image of the person of interest is specified by the retrieval processing, the person retrieval server 50 sends a retrieval result including the whole body image of the person of interest for each of the k monitoring cameras to the client terminal 90. Similarly, when a person matching the face image of the person of interest is specified by the retrieval processing, the face retrieval server 60 sends a retrieval result including the face image of the person of interest for each of the k monitoring cameras to the client terminal 90.

With this configuration, since the person monitoring system 1 can extract the whole body image and the face image representing the appearance features of the suspect with high accuracy when incidents with high recidivism such as snatching (see above description) occur consecutively, the suspect can be efficiently tracked from the viewpoints of both the whole body and the face using the captured video images of the plurality of monitoring cameras corresponding to respective incident sites. Accordingly, the person monitoring system 1 can effectively support early grasp of the escape route of the suspect reflected in the captured video images of the monitoring cameras, and thus the convenience of the police investigation can be improved.

The respective installation points of the k monitoring cameras are different from each other and respective capturing periods of the k monitoring cameras are different from each other. With this configuration, even if incidents with high recidivism such as snatching occur consecutively in a relatively short period of time, the person monitoring system 1 can efficiently retrieve (extract) a person who is a candidate of the same suspect targeted for each of the installation points of the k monitoring cameras, and can narrow down the suspect with high accuracy.

The client terminal 90 displays at least one of the whole body image and the face image of the person of interest for each of the k monitoring cameras side by side in association with each other, based on the retrieval result sent from the person retrieval server 50, the face retrieval server 60, or both. With this configuration, since the user can browse and confirm while comparing images illustrating the appearance features (for example, the whole body, the face, or both) of each of a plurality of persons who may be suspects of a recidivism case that has occurred consecutively, for example, the user can accurately narrow down a suspicious person as compared with the content of a report from a witness, and can detect a suspect early.

Although various embodiments have been described with reference to the accompanying drawings, the present disclosure is not limited to such examples. It is obvious that those skilled in the art can conceive various change examples, modification examples, replacement examples, addition examples, deletion examples, and equivalent examples within the scope of the matters set forth in the claims, and it is understood that these examples also belong to the technical scope of the present disclosure. Further, the constitutional elements the various embodiments described above may be arbitrarily combined without departing from the spirit of the invention.

In Embodiments 1, 2, and 3 described above, the installation points of the monitoring cameras 10, 11, . . . have been described as being outdoors (for example, at intersections), but the installation points are not limited to outdoors. For example, the monitoring cameras may be installed in an indoor facility such as a shopping mall. In this case, the map data MP1 may be displayed on the person monitoring screen WD1 not as a road map but as a premise diagram of the relevant facility (for example, a premise diagram of a shopping mall) may be displayed in the person monitoring screen WD1.

In Embodiments 1, 2, and 3 described above, a criminal who caused an incident or the like or an accomplice who acts together with the criminal as a person to be retrieved in a police investigation has been described as an example, but the retrieval target person is not limited to these examples. For example, a child who has been lost outdoors or indoors may be set as the retrieval target person. In this case, the person monitoring system 1 can retrieve a lost child who is a retrieval target person, with a traveling policeman or security guard serving as a user.

The present disclosure is useful as a person monitoring system and a person monitoring method for, when an incident or the like occurs, extracting a whole body image and a face image representing appearance feature of a suspect with high accuracy, tracking the suspect, supporting an early grasp of a suspect's escape route reflected in a captured video image of a monitoring camera, thereby improving the convenience of police investigation.

The present application is based upon Japanese Patent Application (Patent Application No. 2019-077103 filed on Apr. 15, 2019), the content of which is incorporated herein by reference.

What is claimed is:

1. A person monitoring system comprising:
   a server communicably connected to each of n (n is an integer of 2 or more) monitoring cameras; and
   a client terminal communicably connected to the server, wherein
   the server is configured to,
       receive video images sent from each of the n monitoring cameras, analyze feature information including a whole body and a face of a person reflected in each of the video images and store a whole body image obtained by cutting out the whole body of the person and a face image obtained by cutting out the face of the person as an analysis result,
   the client terminal is configured to,
       in response to designation of a whole body image and a face image of a person of interest, send a request, to the server, for execution of each of first collation processing targeted for the whole body image of the person of interest and second collation processing targeted for the face image of the person of interest, and
   the server is configured to,
       when a person matching at least one of the whole body image and the face image of the person of interest is specified by at least one of the first collation processing and the second collation processing, send, to the client terminal, an alarm notification to the client terminal that the person of interest is found.

2. The person monitoring system according to claim 1, wherein
   the server is configured to,
       store information indicating a moving direction of the person as the analysis result and send the alarm notification including a moving direction of the person of interest when the person of interest passes a monitoring camera in which the person of interest is found, and
   the client terminal is configured to,
       display, on a display, the moving direction of the person of interest when the person of interest passes the monitoring camera in which the person of interest is found in association with the whole body image of the person of interest, based on the alarm notification.

3. The person monitoring system according to claim 2, wherein
the client terminal is configured to,
display, on the display, map data indicating an installation point of at least one monitoring camera in which the person of interest is found.

4. The person monitoring system according to claim 1, wherein
the client terminal is configured to,
when a person matching both the whole body image and the face image of the person of interest is specified, perform an alarm notification that the person of interest is found.

5. The person monitoring system according to claim 1, wherein
the client terminal is configured to,
send a retrieval request for the person of interest in response to designation of a retrieval feature including a target period, a first appearance feature having an age, gender, height, and a body type and a second appearance feature having presence or absence possessions, presence or absence of wearing goods, clothing, and hairstyle,
the server is configured to,
send, to the client terminal, a whole body image of a person, who satisfies the retrieval feature and is substantially directed to a front direction to the extent that a face image of the person is extracted, as a retrieval result, and
the client terminal is configured to,
designate a whole body image and a face image of a person corresponding to the retrieval result as the whole body image and the face image of the person of interest.

6. The person monitoring system according to claim 1, wherein
the server is configured to,
based on the moving direction of the person of interest when the person of interest passes the monitoring camera in which the person of interest is found, set a threshold value of each of the first collation processing and the second collation processing based on a video image of one or more monitoring cameras installed in the moving direction to be lower than a predetermined value.

7. The person monitoring system according to claim 6, wherein
the server is configured to,
set the threshold value of each of the first collation processing and the second collation processing based on a video image of one or more monitoring cameras installed in a direction other than the moving direction without changing from the predetermined value.

8. The person monitoring system according to claim 6, wherein
the client terminal is configured to,
in response to a change operation of appearance feature including presence or absence possessions, presence or absence of wearing goods, clothing, and hairstyle of the person of interest, send, to the server, a request for execution of the first collation processing and the second collation processing based on a retrieval feature including changed appearance feature, and the server is configured to,
when a person matching at least one of the whole body image and the face image of the person of interest who satisfies the retrieval feature is specified by at least one of the first collation processing and the second collation processing, send, to the client terminal, an alarm notification to the client terminal that the person of interest is found.

9. A person monitoring method performed by a person monitoring system including a server and a client terminal, wherein
the server is configured to be communicably connected to each of n (n is an integer of 2 or more) monitoring cameras, and
the client terminal is configured to be communicably connected to the server,
the person monitoring method comprising:
receiving video images sent from each of the n monitoring cameras, analyzing feature information including a whole body and a face of a person reflected in each of the captured video images and storing a whole body image obtained by cutting out the whole body of the person and a face image obtained by cutting out the face of the person as an analysis result,
in response to designation of a whole body image and a face image of a person of interest, sending, to the server, a request for execution of each of first collation processing targeted for the whole body image of the person of interest and second collation processing targeted for the face image of the person of interest, and
when a person matching at least one of the whole body image and the face image of the person of interest is specified by at least one of the first collation processing and the second collation processing, sending, to the client terminal, an alarm notification that the person of interest is found.

10. A person monitoring system comprising:
a server communicably connected to each of n (n is an integer of 2 or more) monitoring cameras; and
a client terminal communicably connected to the server, wherein
the server is configured to,
receive video images sent from each of the n monitoring cameras, analyze feature information including a whole body and a face of a person reflected in each of the video images and store a whole body image obtained by cutting out the whole body of the person and a face image obtained by cutting out the face of the person as an analysis result,
the client terminal is configured to,
in response to designation of k (k is an integer of 2 or more satisfying k≤n) monitoring cameras among the n monitoring cameras and respective capturing periods of the k monitoring cameras, send, to the server, a request for execution of retrieval processing of a whole body and a face of the same person of interest reflected in the captured video images captured by the k monitoring cameras, and
the server is configured to,
when a person matching at least one of the whole body image and the face image of the person of interest is specified by the retrieval processing, send, to the client terminal, a retrieval result including at least one of the whole body image and the face image of the person of interest for each of the k monitoring cameras.

11. The person monitoring system according to claim 10, wherein
respective installation points of the k monitoring cameras are different from each other and respective capturing periods of the k monitoring cameras are different from each other.

12. The person monitoring system according to claim 10, wherein
the client terminal is configured to,
display at least one of the whole body image and the face image of the person of interest for each of the k monitoring cameras side by side in association with each other, based on the retrieval result sent from the server.

13. A person monitoring method performed by a person monitoring system including a server and a client terminal, wherein
the server is configured to be communicably connected to each of n (n is an integer of 2 or more) monitoring cameras, and
the client terminal is configured to be communicably connected to the server,
the person monitoring method comprising:
receiving video images sent from each of the n monitoring cameras, analyzing feature information including a whole body and a face of a person reflected in each of the video images and storing a whole body image obtained by cutting out the whole body of the person and a face image obtained by cutting out the face of the person as an analysis result,
in response to designation of k (k is an integer of 2 or more satisfying k≤n) monitoring cameras among the n monitoring cameras and respective capturing periods of the k monitoring cameras, sending to the server, a request for execution of retrieval processing of a whole body and a face of the same person of interest reflected in the captured video images captured by the k monitoring cameras, and
when a person matching at least one of the whole body image and the face image of the person of interest is specified by the retrieval processing, sending, to the client terminal, a retrieval result including at least one of the whole body image and the face image of the person of interest for each of the k monitoring cameras.

* * * * *